US008218895B1

(12) United States Patent
Gleicher et al.

(10) Patent No.: US 8,218,895 B1
(45) Date of Patent: Jul. 10, 2012

(54) SYSTEMS AND METHODS FOR GENERATING AND DISPLAYING A WARPED IMAGE USING FISH EYE WARPING

(75) Inventors: Michael Lee Gleicher, Madison, WI (US); Feng Liu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 843 days.

(21) Appl. No.: 11/535,808

(22) Filed: Sep. 27, 2006

(51) Int. Cl.
*G06K 9/40* (2006.01)
(52) U.S. Cl. ........ 382/275; 345/427; 345/667; 345/671; 348/556; 382/162; 382/173; 382/243; 382/248; 382/266; 382/282; 382/298
(58) Field of Classification Search .................... 382/275
See application file for complete search history.

(56) References Cited

U.S. PATENT DOCUMENTS

| | | | | | |
|---|---|---|---|---|---|
| 5,172,103 | A | * | 12/1992 | Kita | 345/667 |
| 5,343,238 | A | * | 8/1994 | Takata et al. | 348/556 |
| 5,689,287 | A | * | 11/1997 | Mackinlay et al. | 345/427 |
| 5,856,821 | A | * | 1/1999 | Funahashi | 345/667 |
| 6,982,729 | B1 | * | 1/2006 | Lange et al. | 345/660 |
| 7,212,238 | B2 | * | 5/2007 | Ohtsuki | 348/240.99 |
| 2001/0038390 | A1 | * | 11/2001 | Takaya et al. | 345/671 |
| 2002/0159651 | A1 | * | 10/2002 | Tener et al. | 382/266 |
| 2003/0077002 | A1 | * | 4/2003 | Silverstein et al. | 382/282 |
| 2005/0175251 | A1 | * | 8/2005 | Taketa et al. | 382/248 |
| 2006/0078226 | A1 | * | 4/2006 | Zhou | 382/298 |
| 2006/0280364 | A1 | * | 12/2006 | Ma et al. | 382/173 |
| 2007/0189623 | A1 | * | 8/2007 | Ryu | 382/243 |
| 2008/0123944 | A1 | * | 5/2008 | Xiao et al. | 382/162 |

OTHER PUBLICATIONS

Benjamin Bederson; Fisheye Menus; in *Proceedings UIST '00*, pp. 217-225, 2000.
Benjamin Bederson, Aaron Clamage, Mary Czerwinski, and George Robertson; Datelens: A Fisheye Calendar Interface for PDAs; *ACM Trans. Comput.-Hum. Interact.*, 11(1):90-119, 2004.
M.S.T. Carpendale and Catherine Montagnese; A Framework for Unifying Presentation Space; in *Proceedings of UIST* '01 pp. 82-92, 2001.
Li-Qun Chen, Xing Xie, Xin Fan, Wei-Ying Ma, Hong-Jiang Zhang, and He-Qin Zhou; A Visual Attention Model for Adapting Images on Small Displays; *ACM Multimedia Systems Journal*, pp. 353-364, 2003.
Xin Fan, Xing Xie, He-Qin Zhou, and Wei-Ying Ma; Looking Into Video Frames on Small Displays; in *Proceedings ACM Multimedia 2003*, 2003; Short Paper.

(Continued)

*Primary Examiner* — Anand Bhatnagar
*Assistant Examiner* — Tsung-Yin Tsai
(74) *Attorney, Agent, or Firm* — Crawford Maunu PLLC

(57) ABSTRACT

A retargeted image substantially retains the context of an original image while emphasizing the information content of a determined region of interest within the original image. Image regions surrounding the region of interest are warped without regard to preserving their information content and/or aspect ratios, while the region of interest is modified to preserve its aspect ratio and image content. The surrounding image regions can be warped to fit the resulting warped image regions into the available display space surrounding the unwarped region of interest. The surrounding image regions can be warped using one or more fisheye warping functions, which can be Cartesian or polar fisheye warping functions, and more specifically linear or linear-polynomial Cartesian fisheye warping functions, which are applied along each direction or axis of the region of interest. The image region on each side of the region of interest can be modified using one or more steps.

27 Claims, 16 Drawing Sheets

OTHER PUBLICATIONS

L. Itti and C. Koch; Computational Modeling of Visual Attention; *Nature Reviews Neuroscience*; 2(3):194-203; Mar. 2001.

L. Itti, C. Koch and E. Neibur; A Model of Saliency-Based Visual Attention for Rapid Scene Analysis; *IEEE Trans. Pattern Anal. Mach. Intell.*, 20(11):1254-1259, 1998.

T. Alan Keahey; The Generalized Detail-in-Context Problem; in *Proceedings IEEE Symposium on Information Visualization*, 1998.

T. Alan Keahey and Edward Robertson; Techniques for Nonlinear Magnification Transformations; in *Proceedings IEEE Symposium on Information Visualization*, 1996.

Y.K. Leung and M.D. Apperley; A Review and Taxonomy of Distortion-Oriented Presentation Techniques; *ACM Trans. Comput.-Hum. Interact.*, 1 (2): 126-160, 1994.

Ying Li, Yu-Fei Ma, and Hong-Jiang Zhang; Salient Region Detection and Tracking Video; in *Proceedings of IEEE International Conference on Multimedia and Expo (ICME)*, 2003.

Hao Liu, Xing Xie, Wei-Ying Ma and Hong-Jiang Zhang; Automatic Browsing of Large Pictures on Mobile Devices; in *11th ACM International Conference on Multimedia*, Berkeley, 2003.

Hao Liu, Xing Xie, Xiaoou Tang, Zhi-Wei Li and Wei-Ying Ma; Effective Browsing of Web Image Search Results; in *MIR '04: Proceedings of the 6th ACM SIGMM Workshop on Multimedia Information Retrieval*; pp. 84-90, 2004.

Yu-Fei Ma and Hong-Jiang Zhang; Contrast-Based Image Attention Analysis by Using Fuzzy Growing; in *Proceedings ACM Multimedia 2003*, pp. 374-381, 2003.

Vidya Setlur, Saeko Takagi, Ramesh Raskar, Michael Gleicher and Bruce Gooch; Automatic Image Retargeting; in *Technical Sketch*, Siggraph 2004, 2004.

Bongwon Suh, Haibin Ling, Benjamin B. Bederson, and David W. Jacobs; Automatic Thumbnail Cropping and Its Effectiveness; in *Proceedings UIST '03*, pp. 95-104, 2003.

P. Viola and M. Jones; Rapid Object Detection Using a Boosted Cascade of Simple Features; in *Proc. Conf on Computer Vision and Pattern Recognition*, pp. 511-518, 2001.

Jun Wang, Marcel Reinders, Reginald Lagendijk, Jasper Lindenberg and Mohan Kankanhalli; Video Content Presentation on Tiny Devices; in *IEEE International Conference on Multimedia and Expo (IMCE 2004)*, 2004; Short Paper.

Christopher C. Yang, Hsinchun Chen, and K.K. Hong; Visualization Tools for Self-Organizing Maps; in DL '99: *Proceedings of the Fourth ACM Conference on Digital Libraries*; pp. 258-259, 1999.

A. Zanella, M.S.T. Carpendale and M. Rounding; on the Effects of Viewing Cues in Comprehending Distortions; in *Proceedings of ACM Nordi-CHI '02*, pp. 119-128, 2002.

Feng Liu and Michael Gleicher; Automatic Image Retargeting with Fisheye-View Warping; in *UIST '05: Proceedings of the 18th Annual ACM Symposium on User Interface Software and Technology*, Seattle, WA Oct. 23-26, 2005, pp. 153-162.

\* cited by examiner

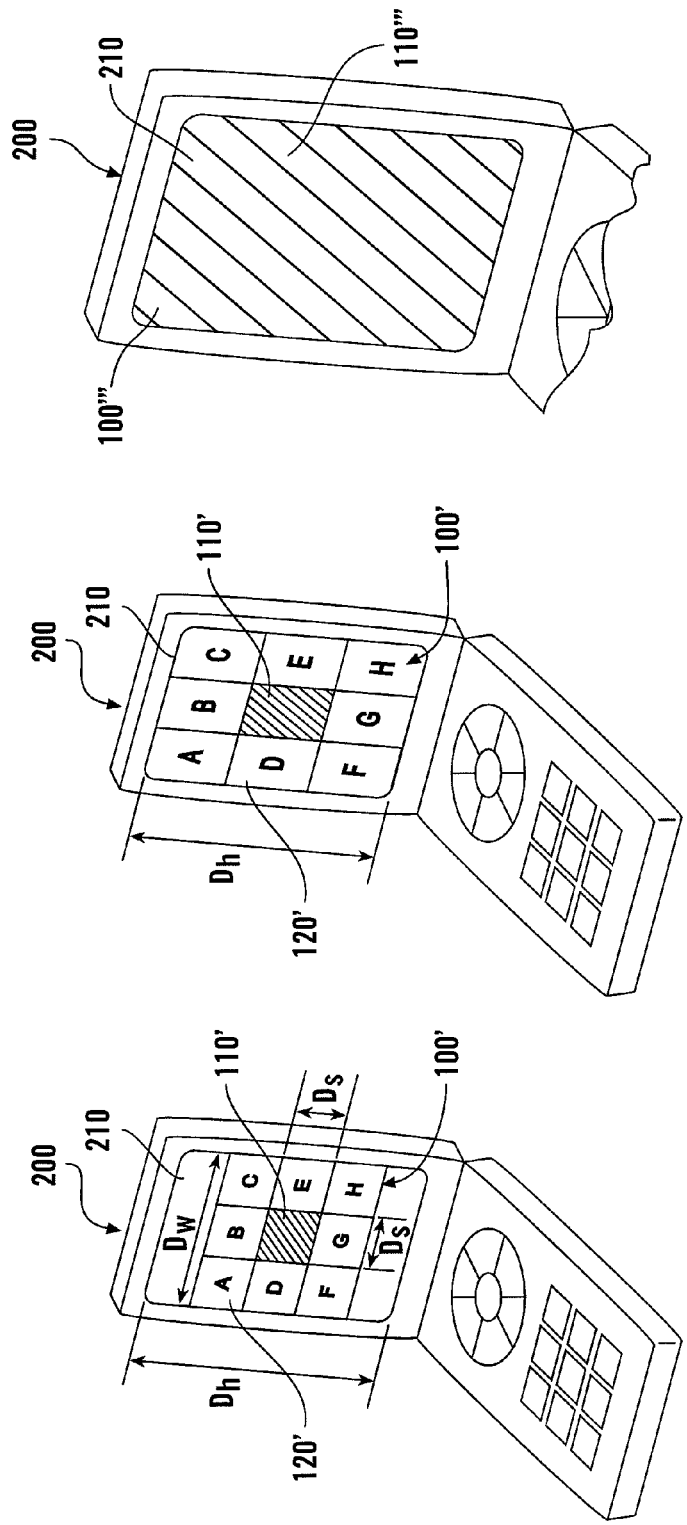

SYSTEMS AND METHODS FOR GENERATING AND DISPLAYING A WARPED IMAGE USING FISH EYE WARPING

The subject matter of this application was made with U.S. Government support awarded by the following agency: NSF grants: IIS-0097456 and IIS-0416284. The United States has certain rights in this invention.

BACKGROUND OF THE INVENTION

1. Field of the Invention

This invention is directed to systems and methods for creating a modified image from an original image.

2. Related Art

Images are modified for a variety of reasons. One reason for modifying an image is to change how the image is displayed on a display device that is smaller than the display device the image was originally designed to be displayed on. Modifying an image to be displayed on a display device that is different than the display device the image was originally designed for is called retargeting.

As will be discussed in greater detail below, image retargeting techniques, such as display device retargeting, image zooming and the like, have conventionally focused on two techniques: 1) image resizing or image scaling, and 2) image cropping. However, these techniques are often unsatisfactory. Image resizing is often unsatisfactory because the resulting image often retains an insufficient amount of information and often contains aspect ratio changes that distort the retargeted image. The lack of sufficient information in the resized or scaled image is typically due to the reduced size, and thus reduced number of pixels, devoted to the various image elements appearing in the image foreground and background portions of the resized or scaled image.

In contrast, in image cropping, the cropped image retains a portion of the original image, while the rest of the original image content is discarded. Thus, like a resized or scaled image, the resulting cropped image also often retains insufficient information from the original image. Thus, like image resizing or scaling, image cropping is also often unsatisfactory. In contrast to image resizing, where the loss of information is spread evenly throughout the image, in image cropping, typically no or little information is lost in the portion of the image that is retained. However, the image elements, and thus the information content, of the discarded portions of the image are lost completely. This often means that the context of the remaining cropped image is lost.

SUMMARY OF THE DISCLOSED EMBODIMENTS

At the same time, these two image processing techniques also have distinct advantages. For example, a resized or scaled image allows the viewer to appreciate the full context of the original image, even if the viewer is not able to discern fine details in the resized image. In contrast, image cropping allows the viewer to discern the fine details of the image elements appearing in the cropped image, even if the full context of the original image is lost.

This invention provides systems and methods for generating a retargeted image that emphasizes a particular region of interest within the retargeted image while preserving the context of the image portions that lie outside of the region of interest.

This invention separately provides systems and methods for generating a retargeted image having an unwarped region of interest and warped image portions surrounding the region of interest.

This invention separately provides systems and methods for warping image areas outside of a determined region of interest within the original image.

This invention separately provides systems and methods for generating a fisheye warped image.

This invention separately provides systems and methods for generating a Cartesian fisheye warped image.

This invention separately provides systems and methods for generating a linear Cartesian fisheye warped image.

This invention separately provides systems and methods for generating a linear-quadratic Cartesian fisheye warped image.

This invention separately provides systems and methods for generating a fisheye warped image displayable on a display device having a reduced screen area.

This invention separately provides systems and methods for generating and displaying a fisheye warped image having a resized region of interest using a proportional amount of screen real estate relative to an unwarped original image.

In various exemplary embodiments of systems and methods according to this invention, a retargeted image is generated that substantially retains the context of the original image while emphasizing the information content of a region of interest of the original image. In various exemplary embodiments, the original image is analyzed to determine a region of interest within the original image. To form the retargeted image, the image regions of the original image surrounding the region of interest are modified without regard to preserving their information content and/or aspect ratios, while the region of interest is modified such that its aspect ratio is preserved. In various exemplary embodiments, the image region outside of the region of interest is warped in one or more directions. In various exemplary embodiments, the image region surrounding the region of interest is warped to fit the resulting warped image region into the available display space surrounding the unwarped region of interest.

In various exemplary embodiments, the image regions within the original image surrounding the region of interest are modified using one or more fisheye warping functions. In various exemplary embodiments, the image region within the original image surrounding the region of interest is modified using one or more Cartesian or polar fisheye warping functions. In various exemplary embodiments, the image region outside of the region of interest is modified using one or more linear Cartesian fisheye warping functions. In various exemplary embodiments, each linear Cartesian fisheye warping function is applied along one of the major directions or axes of the region of interest. In various exemplary embodiments, the linear Cartesian fisheye warping function uses a single step. In various other exemplary embodiments, the linear Cartesian fisheye warping uses a plurality of steps. In various exemplary embodiments, the image region outside of the region of interest is modified using one or more linear-quadratic Cartesian fisheye warping functions.

In various exemplary embodiments, the region of interest is determined intelligently. In various exemplary embodiments, the region of interest is determined by creating and weighting a saliency map from the original image and/or by identifying any identifiable objects in the original image, if any. In various exemplary embodiments, an importance map is then generated based on the weighted saliency map and any identified objects appearing in the original image. In various exemplary embodiments, a dominant area within the importance map is identified. In various exemplary embodiments, the region of interest is determined based on the identified dominant area and the saliency distribution in the original image.

These and other features and advantages of various exemplary embodiments of systems and methods according to this invention are described in, or are apparent from, the following detailed descriptions of various exemplary embodiments of systems and methods according to this invention.

BRIEF DESCRIPTION OF DRAWINGS

Various exemplary embodiments of systems and methods according to this invention will be described in detail, with reference to the following figures, wherein:

FIG. 2 illustrates a handheld device having a display device having a relatively small screen area and displaying a first resized or scaled version of the image shown in FIG. 1;

FIG. 3 shows the display device of FIG. 2 displaying a second resized or scaled version of the image shown in FIG. 1;

FIG. 4 shows the display device of FIG. 2 displaying an intelligently cropped version of the image shown in FIG. 1;

DETAILED DESCRIPTION OF EXEMPLARY EMBODIMENTS

Modern computer, cell phone and personal digital assistant (PDA) technologies have left the public awash in a sea of images and varying devices, of varying capabilities, that are useable to view those images. These image-generating technologies and modern communications technologies have also provided the public with the ability to share these images and access images available on the Internet and other networks.

Figure 1:
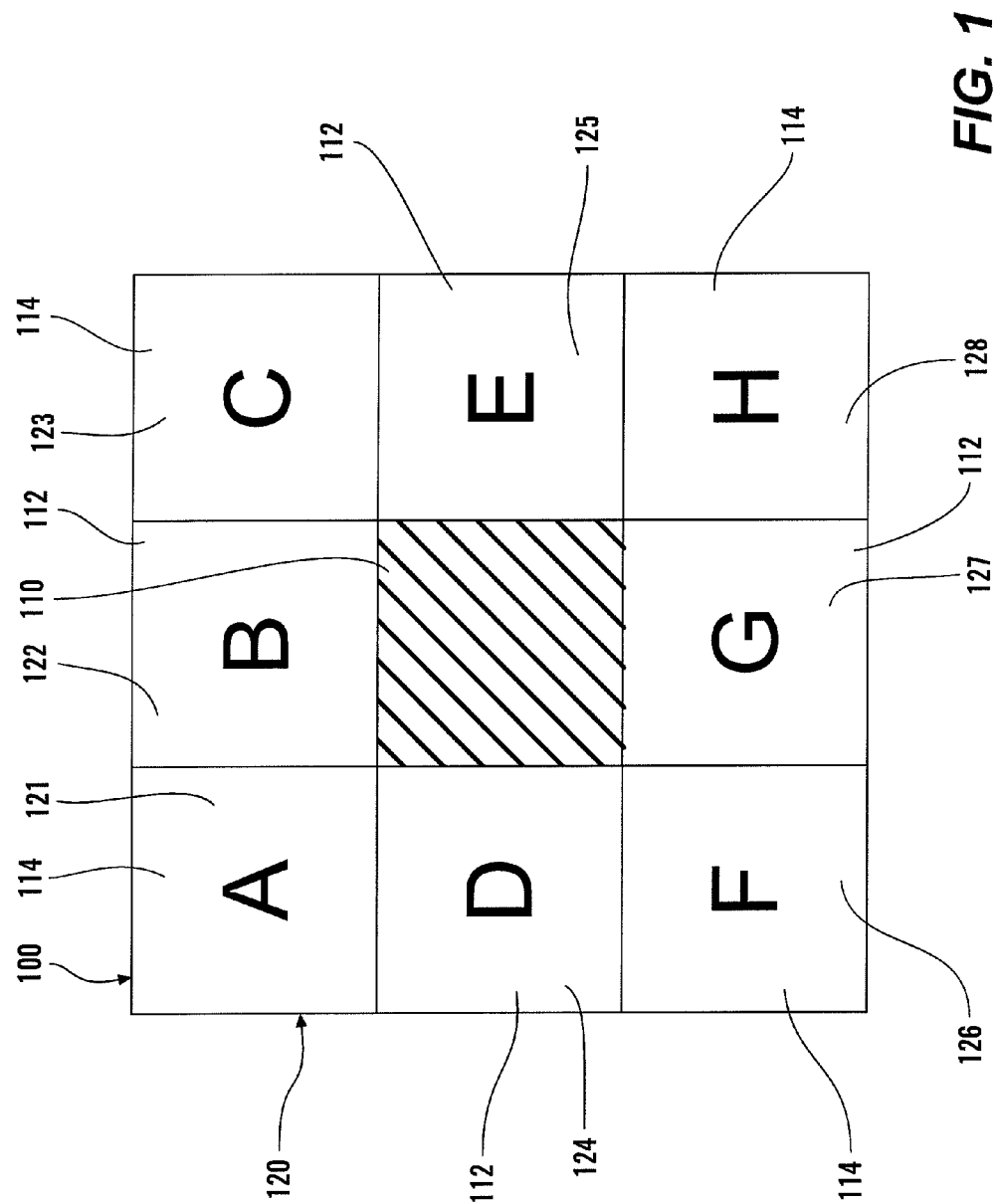
FIG. 1 is a schematic representation of an original, unmodified image.

Whether obtained using a scanner, a digital camera, a camera embedded in a cell phone, created from scratch using an image creating or generating program, or computer generated from database information or the like, the typical digital image is sized and dimensioned to be appropriately viewed on a full-sized monitor or other display device connected to a laptop or desktop computer or the like. Images stored locally on a user's computer, such as that shown in FIG. 1, are typically viewed using a picture viewer application or the like that displays the image in a window sized so that the entire image can be seen on the display screen at once. Images obtained by accessing the Internet are typically displayed in browser windows, where the size of the image is defined by the HTML, XML or other code for that image that is included in the accessed web page. However, the web page designer typically allocates sufficient display area within the web page for a given image to be displayed such that a reasonably-sized image can be displayed within the browser window.

As outlined above, when the target display device, such as that shown in FIG. 2, has less display area than the original or source image, such as that shown in FIG. 1, needs if displayed at full size, the target image will need to be smaller than the original or source image. In this situation, throwing away some information in the original image is unavoidable. One common, but naïve, approach to retargeting merely scales the original image down to the size of the target displays screen using appropriate down-sampling. As indicated above, this uniformly throws away detail information throughout the image. This loss of detail can make important parts of the image difficult, if not impossible, to recognize. If the aspect ratio of the original image is maintained in the down-sampled image, as shown in FIG. 2, display real estate in the display screen is wasted. If, as shown in FIG. 3, the retargeted image is scaled differently in the horizontal dimension than in the vertical dimension, this aspect ratio change can make recognizing important parts of the image even more difficult.

The core problem with such a naïve retargeting is that, by uniformly throwing away information, such naïve retargeting does not take into account that some parts of the image are more important that other parts of the image. For example, in a digital photograph, a face that covers a tenth of the extent of the image in each dimension is sufficiently large enough to be recognized. When such an image is down-sampled to the resolution commonly available on cell phones or used in thumbnail images, the size of the retargeted image is so small that it is difficult to determine that a face even appears in the retargeted image.

Another type of naïve retargeting is simple, unintelligent cropping, where a predefined or predetermined central area of the image is retained, and all of the other areas of the original image are discarded. Such unintelligent cropping avoids the aspect ratio distortions that are present in the resized image shown in FIG. 3 and the loss of content issues present in both resized images shown in FIGS. 2 and 3. However, such unintelligent cropping assumes that the important portions of the original image are in the center, retained portion of the original image. If this is not true for a given image, the cropped version of that image will not contain the most important portion of the original image.

Intelligent cropping attempts to avoid this problem by analyzing the original image to identify the most important portion, i.e., the region of interest, of the original image. When intelligently cropping the original image, the region of interest is determined based on the size of the display screen on which the cropped image is to be displayed. However, regardless of which type of cropping is used, by completely discarding the image areas outside of the cropped portion, the image content in those portions and the context provided to the retained region of interest by those portions are lost.

FIG. 1 illustrates an exemplary original image 100. As shown in FIG. 1, the original image 100 includes a region of interest 110 and a remaining image region 120. In various exemplary embodiments according to this invention, the remaining image region 120 is treated as a single object. However, the remaining image region 120 of the original image 100 can be conceived of as comprising various neighboring image portions 121-128. Some of the neighboring image portions 121-128 are side adjacent image regions 112, such as the neighboring image portions 122, 124, 125 and 127, labeled "B", "D", "E" and "G", while other ones of the neighboring image portions 121-128 are corner adjacent image regions 114, such as the neighboring image portions 121, 123, 126 and 128, labeled "A", "C", "F" and "H".

It should be appreciated that, in the exemplary embodiment shown in FIG. 1, a generally square original image 100 is shown having a generally square region of interest 110 that is generally centered in the square original image 100. This is done in the figures of this application so that the changes to the various portions of the original image 100 made to create the various retargeted images can be more easily discerned. However, it should be appreciated that most typical actual images will not be square, and will not have square and/or centered regions of interest 110. Rather, most real images will be rectangular, with the image elements in either a landscape orientation or a portrait orientation to the long dimension of the image. Likewise, whether square or rectangular, most images will have rectangular and/or off-center regions of interest 110.

As indicated above, the original image 100 shown in FIG. 1 is typically sized for display on a full-sized display device associated with a laptop or desktop computer. In general, an original image, such as the original image 100 shown in FIG. 1, that can easily be displayed at full size on a desktop or laptop display device is too big to be displayed on the screens of PDAs or cell phones or other devices having small display screens without reducing the size of the original image 100.

Accordingly, such full-size images are typically retargeted, i.e., modified, for display on such small-screen devices. FIG. 2 illustrates one exemplary embodiment of a typical cell phone 200 having a display screen 210 on which a retargeted version of the original image 100 shown in FIG. 1 is to be displayed. As outlined above, the display screen 210 of the cell phone 200 typically has a width $D_w$, and a height $D_h$. In contrast, the full-size original image 100 shown in FIG. 1 will typically have an original image height $O_h$ and an original image width $O_w$.

Accordingly, as shown in FIG. 2, to display the entire original image 100 shown in FIG. 1 on the display screen 210 of the cell phone 200 shown in FIG. 2, the original image 100 must be retargeted or modified. In particular, in the exemplary embodiment shown in FIG. 2, the original image 100 is retargeted by resizing it to form a retargeted image 100'. In this exemplary embodiment, the aspect of the original image 100 is preserved. Accordingly, the resized image 100' is created by down-sampling the original image 100 by the same ratio in both the horizontal and vertical directions or dimensions. In this particular embodiment, the display screen 210 is smaller in the horizontal direction. Accordingly, the resized image 100' shown in FIG. 2 is formed by down-sampling the original image 100 by the ratio of the width $D_w$ of the display screen 210 to the width $O_w$ of the original image 100.

As shown in FIG. 2, while the resized image 100' provides sufficient context to allow the viewer to generally appreciate what is being shown in the resized image 100', the resized image 100' provides too much context and too little content. More importantly, due to the reduced size of the resized image 100', there is insufficient detail in the region of interest 110' due to the available screen space, and thus image content, being spread out among too much context. Accordingly, it becomes difficult, if not impossible, to appreciate the image content in the resized image 100', and especially the image content in the region of interest 110'. Additionally, because the aspect ratio of the original image was preserved, some of the limited display area of the display screen 210 remains unused.

In contrast, in FIG. 3, the resized image 100" shown in FIG. 3 is formed by down-sampling the original image 100 by the ratio of the width $D_w$ of the display screen 210 to the width $O_w$ of the original image 100 in the horizontal direction, while down-sampling the original image 100 by the ratio of the height $D_h$ of the display screen 210 to the height $O_h$ of the original image 100 in the vertical direction. While this ensures that all of the limited display area of the display screen 210 is used, the aspect ratio of the original image 100 is not preserved in the resulting retargeted image 100", which is significantly distorted. Thus, relative to the exemplary embodiment shown in FIG. 2, modifying the aspect ratio of the displayed resized image 100" to the aspect ratio of the display screen 210 increases the size of the resized image 100" along the height dimension. This provides additional room to show additional details of the original image 100. However, the overall distortion in the resized image 100" displayed in the embodiment shown in FIG. 3, combined with the overall lack of detail, can render the image difficult, if not impossible, to use.

In contrast to both FIGS. 2 and 3, FIG. 4 shows a substantially different way of retargeting the original image 100. In particular, FIG. 4 shows the display screen 210 of the cell phone 200 and a third exemplary embodiment of a retargeted image 100'''. In particular, the third exemplary retargeted image 100''' is formed by intelligently cropping the original image 100, so that the region of interest 110''' is fit to the boundaries of the display screen 210. That is, as shown in FIG. 4, in intelligent cropping, the identified region of interest 110 in the original image 100 will be selected so that the dimensions of the region of interest 110 match the dimensions, i.e., the size and the aspect ratio, of the display screen 210.

While intelligently cropping the original image 100 allows the displayed retargeted image 100''' to be focused on the content within the determined region of interest in the original image 100, the cropped image 100''' has relatively too much detail in the region of interest 110''', and includes too little (and, in fact, no) content of, or context from, the portions of the image that lie outside of the region of interest 110'''. In particular, the cropped image 100''' omits all of the image content of, and all of the context provided by, the remaining image region 120 of the original image 100 that lies outside of the region of interest 110'''. In the cropped image 100''', because none of the content or context provided by the remaining image region 120 of the original image 100 outside of the region of interest is shown in the cropped image 100''', it becomes almost impossible to determine the context surrounding the region of interest 110'''. Without any indication of the content in the remaining image region 120 of the original image 100 that was removed to create the cropped image 110''', it becomes impossible to fully appreciate the context of the cropped image 100'''.

Figure 5:
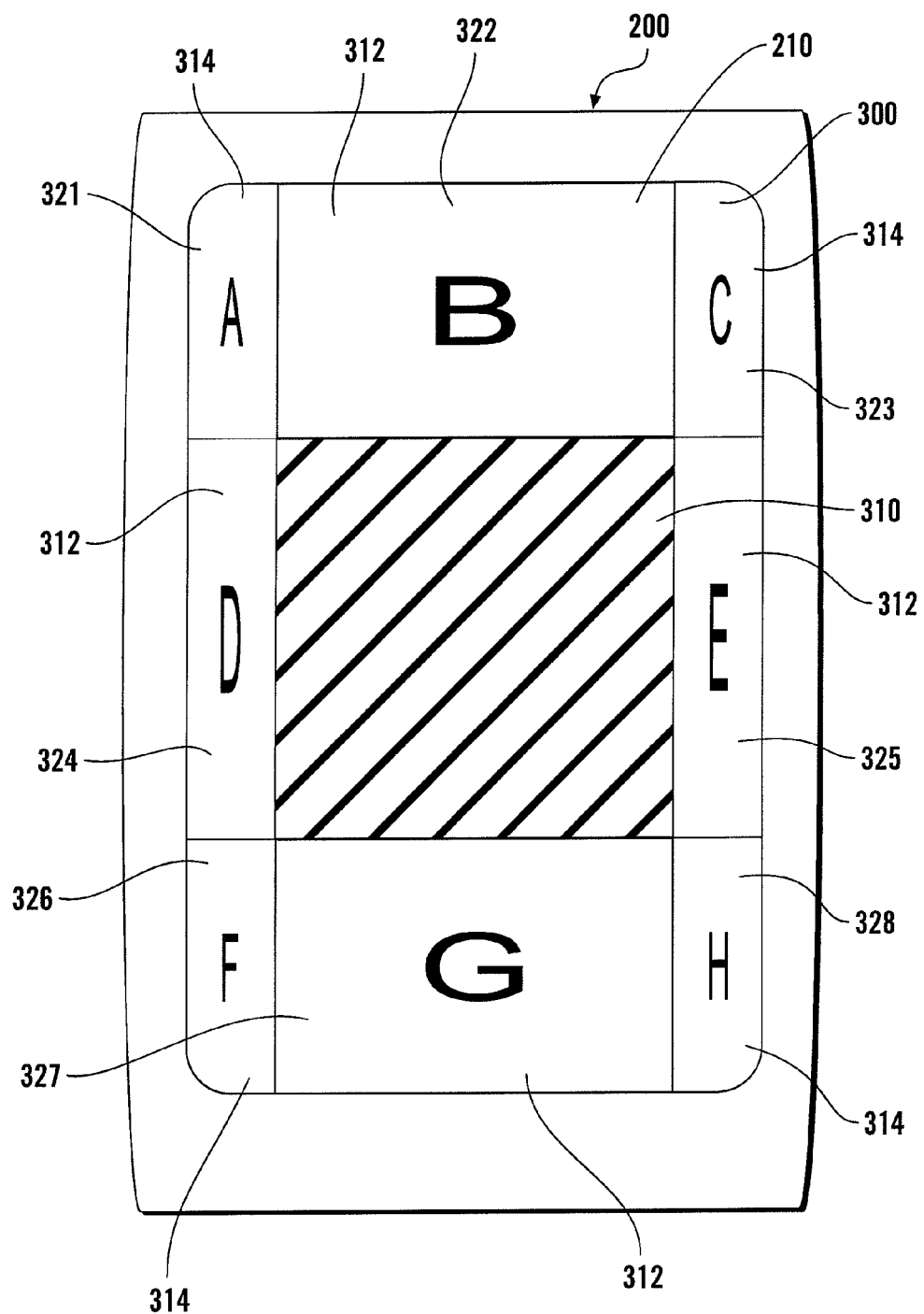
FIG. 5 shows the display device of FIG. 2 displaying a retargeted image modified using one exemplary embodiment of systems and methods according to this invention.

In contrast, FIG. 5 illustrates one exemplary embodiment of a retargeted image 300 that has been modified according to this invention. In particular, as shown in FIG. 5, the retargeted image 300 is also displayed on the display screen 210 of the cell phone 200 shown in FIG. 2. However, unlike the resized images 100' and 100" shown in FIGS. 2 and 3, the region of interest 310 in the retargeted image 300, while possibly scaled down, is not distorted and remains sufficiently large that the detail and content of the region of interest 310 can be discerned. At the same time, unlike the cropped image 100''' shown in FIG. 4, the remaining image region 320, while reduced in size and distorted, possibly significantly so, remains visible within the retargeted image 300. Thus, the remaining image region 320 allows the viewer to appreciate the context of the region of interest 310 in the retargeted image 300. At the same time, the content of the original image 100 in the remaining image region 120 surrounding the region of interest 110 is not as significant as content of the region of interest 310. Accordingly, in the retargeted image 300, the content of the remaining image region 320 is reduced or modified relative to that of the region of interest 310.

In the particular exemplary embodiment shown in FIG. 5, the neighboring image portions 321-328 of the remaining image region 320 are modified in specific ways that allow the full context of the original image 100 to be presented in the retargeted image 300 without providing all of the detail, e.g., the image content or image information, in the remaining image region 320 of the retargeted image 300 that is present in the remaining image region 120 of the original image 100.

In various exemplary embodiments, as will be discussed in greater detail below, the remaining image region 320, comprising the neighboring image portions 321-328, is generated by applying one or more fisheye warping functions to the remaining image region 120 of the original image 100 to generate the remaining image region 320 of the retargeted image 300. As will be discussed in greater detail below, these fisheye warping functions include any known or later developed fisheye warping functions. Known fisheye warping functions include, but are not limited to, polar-radial fisheye warping functions and Cartesian fisheye warping functions. The Cartesian fisheye warping functions include, but are not limited to, piece-wise linear or linear-quadratic Cartesian fisheye warping functions.

It should be appreciated that, regardless of the type of fisheye warping function used to generate the retargeted image 300 shown in FIG. 5 from the original image shown in FIG. 1, the retargeted image 300 will generally have certain features. For example, as shown on FIG. 5, the region of interest 310, while typically being scaled down in size from the original region of interest 110 by the fisheye warping function, will typically preserve the aspect ratio of the original region of interest 110, so that the image content or information of the retargeted region of interest 310 is typically not warped or the like, or is only minimally so. At the same time, the retargeted region of interest 310, regardless of how much space the region of interest 110 occupies in the original image 100, occupies a substantial portion of the retargeted image 300. In various exemplary embodiments, the retargeted region of interest 310 can occupy about 40% or more of the area of retargeted image 300. These features allow the image context of the retargeted region of interest 310 to be easily appreciated.

At the same time, the fisheye warping function(s) will typically warp the remaining image region 120 so that the retargeted remaining image region 320 will fit within the remaining area of the retargeted image 300 around the retargeted region of interest 310. Because this image content is treated as less important than the image content of the retargeted region of interest 310, the aspect ratios of the various neighboring image areas 321-328 within the remaining image regions 320 are freely modified. At the same time, because at least some image content in the neighboring image areas 121-128 is present on the retargeted neighboring image areas 321-328, the context provided by the remaining image region 120 is more or less preserved within the retargeted remaining image region 320. Thus, the fisheye warped retargeted image 300 balances the ability of image cropping to preserve image content of the region of interest 110 with the ability of image resizing to preserve the image context provided by the remaining image region 120.

In various exemplary embodiments, to generate the retargeted image 300, the retargeted region of interest 310 is identified automatically by identifying important portions of the original image 100 and drawing a bounding box that encloses the identified region of interest 110, with the portions outside of the bounding box becoming the remaining image region 120. In various other exemplary embodiments, the user can directly specify the location and size of the region of interest 110. Moreover, it should be appreciated that, in still other exemplary embodiments, secondary reference data can be used to define the region of interest 110.

Regardless of how the region of interest 110 is defined, it should be appreciated that the bounding box bounding the region of interest 110 need not be quadrilateral. That is, the region of interest can be bounded by any "star" polygon or curve. A "star" polygon or curve is a polygon or curve where at least one point exists within the interior of that polygon or curve that has a line of sight to every other point on the surface of the polygon or curve. Thus, it should be appreciated that the region of interest can be, for example, any regular or irregular simple polygon or closed curve. In the following detailed description, the various regions of interest are shown as squares or rectangles.

In addition to the region of interest 310 being a "star" polygon or curve, it is also desirable that the warping function used to generate the image data in the retargeted image 300 be continuous. That is, it is desirable that the warping function define the image data for all points in the retargeted image 300. It should be appreciated that it is not important whether the derivative of the warping function also be continuous.

It is also desirable that the warping function used to generate the retargeted image 300 be monotonic. That is, it is desirable that the modified or retargeted image 300 does not fold back over itself. If the retargeted image 300 were to fold back over itself, two different points in the original image 100 would map onto a single point in the retargeted or modified image 300. Finally, it is desirable that there be a one-to-one mapping between the edge points of the original image 100 and the edge points of the retargeted image 300.

Figure 6:
FIGS. 6 and 7 show two exemplary images and automatically determined regions of interest identified in those two images.
Figure 7:
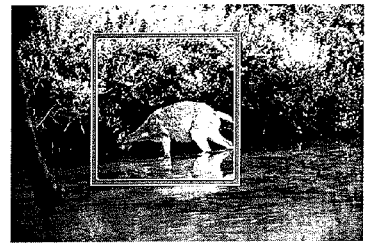
Figure 8:
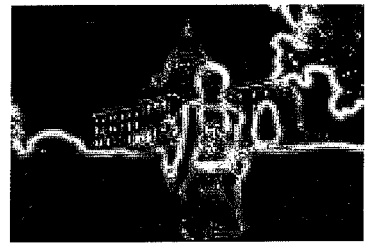
FIGS. 8 and 9 illustrate exemplary embodiments of contrast maps according to this invention generated from the original images shown in FIGS. 6 and 7, respectively.
Figure 9:
Figure 10:
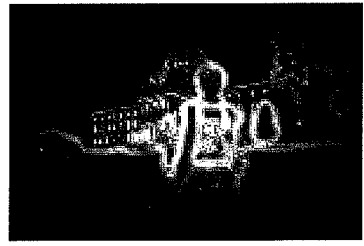
FIGS. 10 and 11 illustrate exemplary embodiments of weighted saliency maps according to this invention generated from the unweighted contrast maps shown in FIGS. 8 and 9, respectively.
Figure 11:
Figure 12:
FIGS. 12 and 13 illustrate exemplary embodiments of importance maps and determined regions of interest according to this invention generated from the original images shown in FIGS. 6 and 7, respectively.
Figure 13:
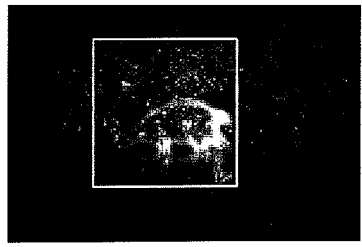

FIGS. 6-13 are images illustrating various steps of one exemplary embodiment of a method for identifying the region of interest. FIGS. 6 and 7 show the original image data for two sample images, one having a single identifiable object, and the other lacking any identifiable object. In particular, FIG. 6 has a single identifiable object, a face, while FIG. 7 has no identifiable objects. FIGS. 6 and 7 also show the eventual region of interest that will be identified for these two sample images. FIGS. 8-13 show the results of applying various image processing techniques to FIGS. 6 and 7. In particular, FIGS. 8, 10 and 12 are generated from FIG. 6, while FIGS. 9, 11 and 13 are generated from FIG. 7.

Appropriately appreciating what is of interest in an image requires understanding both the image elements contained in the image and the needs of the viewer. There are two significant classes of image elements that reflect interesting or important portions of an image: objects in the image that draw the user's attention and image features that draw the attention of the low-level visual system. Such objects that draw the attention of the viewer are faces, buildings, vehicles, animals, and the like. Thus, if such objects can be reliably detected in an image, they can be used to identify important or interesting portions of the image.

Visual salience refers to the degree to which a portion of an image stands out or is likely to be noticed by the low-level human visual system. Intuitively, without regard to other information about the meaning of an image or the needs of the viewer, the more visually salient portions of an image are likely to be of greater importance or interest to the viewer than those portions of the image that are not visually salient. A saliency map defines, for each pixel or group of pixels in an image, a value that indicates how much that pixel or group or pixels attracts the low-level human visual system.

While any known or later-developed technique that adequately identifies the salient portions of the image can be used, in various exemplary embodiments according to this invention, the saliency is determined using a contrast-based technique. Various techniques for identifying the saliency in an image are disclosed in "Computational modeling of visual attention", L. Itti et al., Nature Review Neuroscience, 2(3): 194-203, March 2001, in "A model of saliency-based visual attention for rapid scene analysis", L. Itti et al., IEEE Trans. Pattern Anal. Mach. Intell., 20(11):1254-1259, 1998 and "Contrast-based image at tension analysis by using fuzzy growing", Yu-Fei Ma et al., Proceedings ACM Multimedia 2003, pp. 374-381, 2003, each of which is incorporated herein by reference in its entirety.

FIGS. 8 and 9 are non-center weighted contrast maps that reflect the amount of contrast in a neighborhood around each of the pixels in the images shown in FIGS. 6 and 7, respectively. In FIGS. 8 and 9, dark values represent lesser amounts of contrast and light values represent greater amounts of contrast. For FIGS. 8 and 9, solely to improve the visibility of the contrast maps shown in FIGS. 8 and 9, the contrast map values have been normalized so that the lowest contrast value in the image is set to zero, while the highest contrast value in the images is set to 255. Not unexpectedly, in FIG. 8, the visually important portions of the image, such as the building, the person and the transitions between the sky, the building, the ground and/or the trees, all have high contrast values, while the background sky, ground and internal regions of the trees and other foliage have low contrast values. Likewise, in FIG. 9, the animal and the foliage have relatively high contrast values, while the stream has relatively low contrast values.

FIGS. 10 and 11 show various exemplary embodiments of weighted saliency maps created from the non-weighted contrast maps. The saliency values are weighted based on their distance from the center of the image because, for the typical image, the image elements in the center of the image are typically more visually important than those on the periphery of the image. To create the weighted saliency maps, the contrast values are center-weighted and summed, as outlined below. The contrast values are center-weighted such that, the farther away from the center point of the image a pixel is, the less weighting is given to the contrast value of that pixel. Again, in FIGS. 10 and 11, for these images, the weighted saliency values have been normalized so that the lowest weighted saliency value is set to zero and the highest weighted saliency value is set to 255.

In various exemplary embodiments the saliency value for a given pixel that is located at the pixel position (i, j) in the image is:

$$S_{i,j} = \sum_{q \in \theta} w_{i,j} d(p_{i,j}, p_q)$$

where:

$S_{i,j}$ is the saliency value for the pixel at the pixel location (i, j);

$\theta$ is the neighborhood of pixels around the pixel location (i, j);

q is a pixel within the defined neighborhood $\theta$ around the pixel location (i, j);

$w_{i,j}$ is the weighting value for the pixel location (i, j);

$p_{i,j}$ and $p_q$ are the original image values for the pixels at the (i, j) and q pixel locations; and d is a function that returns the magnitude of the difference between the contrast values and $p_{i,j}$ and $p_q$.

In various exemplary embodiments, the neighborhood $\theta$ is a 5×5 pixel square neighborhood centered on the pixel location of interest (i, j). In various exemplary embodiments, the function d used to determine the magnitude of the difference between the two pixels is the L2 norm function.

As indicated above, the weighting factor $w_{i,j}$ weights the saliency of the central pixels higher than that of the edge pixels. This reflects that the central pixels are usually more important than the edge pixels. In various exemplary embodiments the weighting factor $w_{i,j}$ is:

$$w_{i,j}=1-(r_{i,j}/r_{max}),$$

where:

$r_{max}$ is the distance from the center of the image to the most distant point on the edge of the image; and $r_{i,j}$ is the distance from the center of the image to the pixel location (i, j).

It should be appreciated that, in various exemplary embodiments, it is not necessary to first generate a distinct contrast map, such as those shown in FIGS. 8 and 9, and then determine the weighted saliency maps shown in FIGS. 10 and 11 from the generated contrast maps shown in FIGS. 8 and 9, respectively. That is, it should be appreciated that the weighted saliency value maps shown in FIGS. 10 and 11 can be generated in a single operation from the original images shown in FIGS. 6 and 7, rather than using two operations as outlined above.

FIGS. 12 and 13 are importance maps generated from the weighted saliency maps shown in FIGS. 10 and 11, respectively. FIGS. 12 and 13 also indicate the regions of interest that can be automatically generated based on the importance maps shown in FIGS. 12 and 13. The importance maps shown in FIGS. 12 and 13 are generated by identifying any identifiable objects, if any, that appear in the image and by appropriately weighting such identifiable objects.

There are many types of objects, which, when appearing in an image, are typically an important part, if not the most important part, of an image. Such identifiable objects often form a significant portion of the subject matter that forms the foreground of an image. Thus, those objects are given a defined or determined saliency value that represents their importance. It should be appreciated that this defined or determined saliency value can be predetermined or can be determined on-the-fly as the method is performed. It should be appreciated that any known or later-developed image processing technique can be applied to identify specific objects that may appear in the original image.

Currently, faces comprise the largest class of specific objects that can be reliably identified in image data. Because humans often make up the most significant subject in an image, identifying faces, if any, that appear in an original image often contributes significantly to identifying the most important portion of the image data. While faces are currently the most reliably detectable specific objects, it is anticipated that, as image processing techniques improve, a variety of additional types of objects will be reliably detectable. For example, such objects can include buildings, vehicles, such as cars, boats, airplanes and the like, and animals. However, it should be appreciated that any known or later-developed technique for identifying any particular specific objects can be used.

FIG. 12 illustrates an image containing a recognizable object and the importance map generated when the image contains one or more such recognizable objects. In particular, in FIG. 12, the portion of the image identified as corresponding to the identified object, which in FIG. 12 is a face, is assigned an importance value independent of its saliency value. In particular, in various exemplary embodiments, the identified objects are given the same value as the value of the highest valued pixels in the saliency map.

To determine the region of interest, a dominant area of the importance map is identified. It should be appreciated that, in various exemplary embodiments, the dominant area within the importance map will typically be the area associated with a specific object if only a single specific object is identified in the image. Otherwise, if there are two or more identified objects, a particular dominant object must be selected.

In contrast, when an image does not contain any recognizable objects, such as the image shown in FIG. 13, the dominant portion of the image must be identified. In various exemplary embodiments, this is done by pixel-by-pixel scanning a defined window over the image and identifying the pixel location where the maximum total saliency value within the defined window is obtained. In the exemplary embodiment shown in FIG. 13, the defined window was a 20×20 pixel window. It should be appreciated that the size of the defined window can be predetermined, can be determined on the fly based on the size of the image, or can be determined based on the amount of the saliency in the image, the distribution of the saliency values or on any other desired known or later developed basis.

Once a dominant area of the image is identified, either based on identified objects appearing in the image or based on the most salient or important portion of the image, the region of interest is grown from that identified dominant portion of the image outward toward the edges until a defined amount of saliency is within the bounds of the region of interest. In various exemplary embodiments, an initial region of interest is defined around the identified dominant area as the current region of interest. Typically, this region of interest will be rectangular. Alternatively, if the dominant area within the importance map follows the outline of a particular object within the image, the shape of that object or a simplified version of that shape can be used. Furthermore, a polygon having more sides or a more complex shape than a quadrilateral can be formed around the dominant area.

The current region of interest is analyzed to determine if it includes the defined amount of saliency of the determined total amount of saliency within the image. It should be appreciated that this defined amount of saliency can be predetermined or can be determined as the image is being processed. In the exemplary embodiments shown in FIGS. 12 and 13, this defined amount of saliency is 70% of the total saliency within the importance map generated from the original image. In various exemplary embodiments, the size of the region of interest is increased until the region of interest has at least the defined amount of saliency of the total amount of saliency in the original image. In various exemplary embodiments, the size of the region of interest is increased by expanding one of the edges of a polygonal region of interest, or a portion of the edge of a curved region of interest, by a determined amount in a determined direction. This creates a new region of interest that contains a larger portion of the total saliency than did the previous version of the region of interest.

Figure 14:
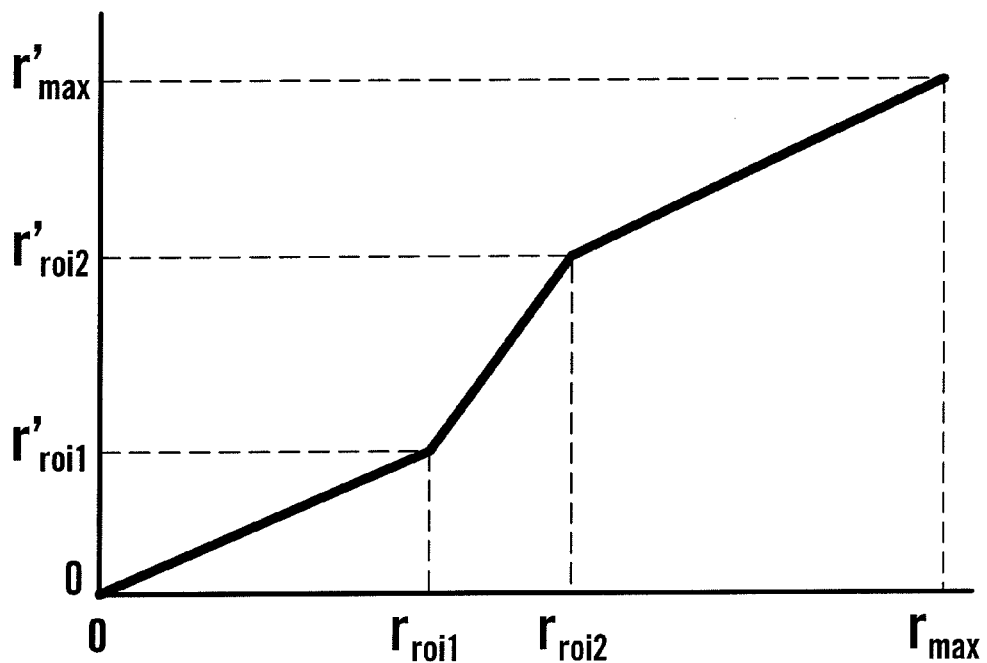
FIG. 14 is a graph illustrating one exemplary embodiment of a 3-step piecewise-linear Cartesian fisheye warping function according to this invention.
Figure 15:
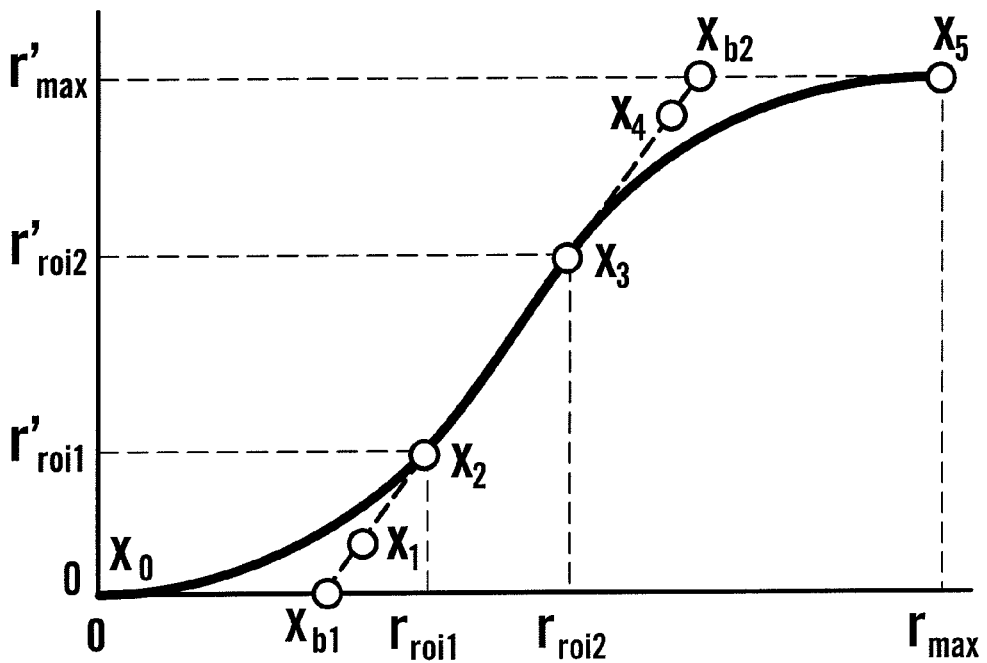
FIG. 15 is a graph illustrating one exemplary embodiment of a continuous linear-quadratic Cartesian fisheye warping function according to this invention.

Once the region of interest is determined or selected, the one or more fisheye warping functions usable to convert the original image 100 into the desired retargeted image 300 suitable for being displayed in the display screen 210 of the cell phone 200 can be determined. FIGS. 14 and 15 illustrate two different types of piece-wise Cartesian fisheye warping functions usable to convert the original image to the retargeted image according to this invention. FIG. 14 illustrates a 3-piece, piece-wise linear Cartesian fisheye warping function, while FIG. 15 illustrates a 3-piece, piece-wise linear-quadratic Cartesian fisheye warping function. In particular, the Cartesian fisheye warping functions shown in FIGS. 14 and 15 can each be viewed as a 3-piece, piece-wise scaling function for one dimension of the region of interest 110. In particular, in each of the piece-wise Cartesian fisheye warping functions shown in FIGS. 14 and 15, the linear center portion of the Cartesian fisheye warping function corresponds to the region of interest 110.

The linear, or generally linear, central region(s) of the fisheye warping function(s) according to this invention that correspond to the determined region of interest 110 allows the aspect ratio of the region of interest 110 to be preserved in the retargeted region of interest 310. That is, because the central regions of the one or more of fisheye warping functions will typically have the same slope, or generally the same slopes, and each dimension of the region of interest 110 will be generally scaled at the same ratio, so the aspect ratio of the region of interest 110 is generally preserved in the retargeted region of interest 310.

It should be appreciated that, in various exemplary embodiments, to generate the retargeted image 300 from the original image 100, for the particular type of fisheye warping function that will be used, such as the Cartesian fisheye warping function shown in FIG. 14 or 15, two different instances of that Cartesian fisheye warping function are applied, either simultaneously or serially, along the two Cartesian (x and y) dimensions of the original image. That is, to generate the retargeted image 300 from the original image 100 using one of the Cartesian fisheye warping functions shown in FIGS. 14 and 15, one such Cartesian fisheye warping function is applied along the x-dimension of the two-dimensional original image 100, while another such Cartesian fisheye warping function is applied along the y-dimension of the two-dimensional original image 100. Typically, the one or more fisheye warping functions (one for each of the dimensions of the region of interest) are combined to form a single, two-dimensional fisheye warping function that is applied to the two-dimensional original image. In this case, the two-dimensional warping function is applied in turn to each pixel of the two-dimensional original image to form the two-dimensional retargeted image 300.

For the square or rectangular regions of interest shown in FIGS. 1-7, 12 and 13, such a square or rectangular region of interest effectively divides the image in to nine portions, where a different combination of the pieces of the piece-wise fisheye warping functions are applied to each such portion along its x and y dimensions. It should be appreciated that, while the same type of piece-wise fisheye warping function is applied to each dimension, the shape of each instance of that piece-wise fisheye warping function will typically be different for each of the x and y dimensions. The shape of each particular instance of that piece-wise fisheye warping function will typically be based on the size and location of the region of interest 110 in the original image 100 and on the relative dimensions of the original and retargeted images 100 and 300.

To create the retargeted image 300, the magnification to be used to convert the identified region of interest 110 in the original image 100 to the retargeted region of interest 310 is first determined. It should be appreciated that, when retargeting an original image 100 for a small-screen device, a magnification value of less than 1 (i.e., demagnification) is actually used. In various exemplary embodiments, the magnification value is selected to scale the identified region of interest 110 so that the retargeted (i.e., magnified or demagnified) region of interest 310 occupies a defined proportion of the width or height of the display screen or window that the retargeted image 300 is being retargeted for. It should also be appreciated that, to avoid the situation outlined above with respect to FIG. 3, the same, or generally the same, magnification value is applied to both the height and the width of the identified region of interest 110, to maintain the appropriate aspect ratio for the retargeted region of interest 310.

The position of the retargeted region of interest 310 within the retargeted image 300 is then determined. Based on the position of the identified region of interest 110 within the original image 100, different portions 121-128 of the remaining image region 120 of the original image 100 that are outside of the region of interest 110 may need to be modified or warped at different ratios, so that the context and positional relationships of the various portions 121-128 of the remaining image region 120 to the region of interest 110 in the original image 100 are maintained in the retargeted image 300.

For example, for the piece-wise linear Cartesian fisheye warping function shown in FIG. 14, for each of the x and y axes, the left and right edges, and the top and bottom edges, respectively, of the original image 100 are set, for example, to the zero and $r_{max}$ values, respectively. At the same time, the left and right side, and the bottom and top side, values for the retargeted image 300 are likewise set, for example, to the zero and $r_{max}$ values, as shown in FIG. 14. The left and right side, or bottom and top side, positions respectively, of the region of interest 110 are $r_{roi1}$ and $r_{roi2}$, respectively, and are plotted along the horizontal axis based on the size and location of the region of interest 110 in the original image 100. Likewise, the left and right, or bottom and top, positions $r'_{roi1}$ and $r'_{roi2}$, respectively, of the region of interest 310 in the retargeted image 300 are plotted along the vertical axis based on the size and location of the region of interest 310 in the retargeted image 300. As indicated above, the size and location of the retargeted region of interest 310 is based on the determined magnification value.

As outlined above, the ratio of the size of the region of interest 110 in the original image 100 and the region of interest 310 in the retargeted image 300 is the defined magnification $M_d$ and is generally constant across the retargeted region of interest 310 along both the horizontal and vertical dimensions. This is reflected in the central portion of the curve in FIG. 14, where the slope of that central portion is based on the defined magnification value. Because the size of the retargeted remaining image region 320 surrounding the retargeted region of interest 310 in the retargeted image 300 is known, it is possible to linearly scale each side of the remaining image region 120 in the original image independently so that the image data in the remaining image region 120 fits in the area in the retargeted image 300 available for the corresponding retargeted remaining image region 320. As shown in FIG. 14, these independent scaling factors correspond to the portions of the linear Cartesian fisheye warping function on either side of the central portion of the linear Cartesian fisheye warping function that corresponds to the region of interest 110/310. The scaling factor corresponds to the slope of the corresponding portion of the linear Cartesian fisheye warping function. It should be appreciated that the slope of the left or bottom portion does not need to be equal to the slope of the top or right side portion and either can be sloped more or less than the other.

However, when using the linear Cartesian fisheye warping function shown in FIG. 14, the scaled objects in the remaining image region 320 are scaled using the same magnification value regardless of where a scaled object appears in the particular remaining image region relative to the edges of the region of interest 310 and the retargeted image 300. It is often desirable that objects lying further from the region of interest 310 be smaller than objects that lie closer to the region of interest 310. Additionally, it is also desirable that there be no discontinuity in the magnification levels between the region of interest 310 and the remaining image region 320. Some or all of these benefits can be obtained by providing piece-wise linear Cartesian warping functions that have more than 3 pieces.

FIG. 15 shows one exemplary embodiment of a linear-quadratic Cartesian fisheye warping function that provides these benefits. Like the linear Cartesian fisheye warping function shown in FIG. 14, the linear-quadratic Cartesian fisheye warping function shown in FIG. 15 can be viewed as a 3-piece, piece-wise scaling function that applies three different scaling sub-functions along the horizontal or vertical dimension. As in the linear Cartesian fisheye warping function shown in FIG. 14, in the linear-quadratic Cartesian fisheye warping function shown in FIG. 15, a linear scaling function is applied over the region of interest 110 between the left and right, or bottom and top, respectively, positions $r_{roi1}$ and $r_{roi2}$ of the left and right, or bottom and top, edges, respectively, of the region of interest 110 to generate the retargeted region of interest 310.

However, in the portions of the linear-quadratic Cartesian fisheye warping functions outside of the region of interest 110, the linear scaling functions shown in FIG. 14 are replaced with polynomial splines. In the exemplary embodiment shown in FIG. 15, the polynomial splines are combined with the linear scaling for the region of interest 110 such that objects that are farther from the region of interest 110 are smaller in size in the retargeted image 300 and the magnification values change continuously between the edges of the retargeted image 300 and the edges of the retargeted region of interest 310. Thus, the linear-quadratic Cartesian fisheye warping function is in effect a linear Cartesian fisheye warping function with an infinite number of pieces.

In particular, in the exemplary embodiment shown in FIG. 15, a quadratic Bézier curve is used for each of the pieces of the linear-quadratic Cartesian fisheye warping function that lie outside of the region of interest 110 or 310. In particular, the quadratic Bézier curve portions provide a smoothly varying amount of magnification, defined by the instantaneous slope of the Bézier curve between the left or bottom edge of the original image 100 and the retargeted image 300, represented by the zero position, i.e., the point $x_0$ and the left or bottom edge of the region of interest 110 or 310 in the original or retargeted image $r_{roi1}/r'_{roi1}$, represented by the point $x_2$. Likewise, a portion of a second quadratic Bézier curve extends from the right or top edge $r_{roi2}/r'_{roi2}$ of the region of interest 110 or 310 in the original and retargeted image 100 or 300, represented by the point $x_3$, and the right or top edge $r_{max}/r'_{max}$ of the original image 100 or the retargeted image 300, represented by the point $x_5$. Thus, the points $(x_0, x_2)$ and $(x_3, x_5)$ represent the endpoints of the two quadratic Bézier curves. It should be appreciated that, when generating linear-quadratic Cartesian fisheye warping functions, different non-linear functions, other than the Bézier curve, could be used. It should also be appreciated that warping functions other than linear-quadratic Cartesian fisheye warping functions can be used.

For each of these quadratic Bézier curves, the position of a middle control point $x_1$ and $x_4$, respectively, must be determined. Moreover, the initial slope of the quadratic Bézier curves at points $x_2$ and $x_3$ desirably matches the slope of the line segment that extends between the points $x_2$ and $x_3$. This tends to ensure that there are no discontinuities in the magnification value across the width or height of the retargeted image 300. By constraining the middle control point $x_1$ to be to the right of and above the endpoint $x_0$ and the middle control point $x_4$ to be to the left of and below the end point $x_5$, the resulting curve will be monotonic. Properties of Bézier curves thus limit the placement of the middle control points $x_1$ and $x_4$ to lie along a line segment that extends through the region of interest edge points $x_2$ and $x_3$ and that extends from the horizontal axis to the $r'_{max}$ value on the vertical axis, as shown in FIG. 15. The $x_{b1}$ and $x_{b2}$ points on this line segment represent where this line segment intersects, respectively, the horizontal axis and the $r'_{max}$ value, as shown in FIG. 15. The middle control points $x_1$ and $x_4$ are then located at $x_1 = (1-\alpha)x_2 + \alpha x_{b1}$, and $x_4 = (1-\alpha)x_3 + \alpha x_{b2}$.

In particular, the parameter α dictates how much emphasis is placed on the areas near the regions of interest. When α0 is set to 1, pixels at the original image edges have zero magnification, so pixels near the edge in the retargeted image 300 have very small magnification, leaving more space for pixels near the retargeted region of interest 310. In contrast, smaller values for α provide a more uniform distribution of the magnification, giving more space to the pixels near the edge of the retargeted image 300. When α equals zero, the curve becomes a line segment so that all pixels on a given piece of the linear-quadratic Cartesian fisheye warping function receive the same magnification.

It should be appreciated that the exact value for α is not critical. In various exemplary embodiments, the value for α can be selected based on the image content. In particular, in various exemplary embodiments, the value of α is determined based on the distribution of the importance map values outside of the region of interest 110 or 310. For example, as the amount of importance in the importance map lying close to the edges of the retargeted image 300 increases relative to the amount of importance adjacent to the retargeted region of interest 310, over the entire image, the smaller α should be. In particular, α can be determined as:

$$\alpha = 1 - \left[ \frac{\sum_{(i,j) \in c} rA_{i,j}}{r_{max} \sum_{(i,j) \in c} A_{i,j}} \right]$$

where:
C is the set of pixels not in the region of interest,
$A_{i,j}$ is the importance value for the pixel location (i, j);
r is the distance from the center of the region of interest to the pixel location (i,j);
$r_{max}$ is the maximum distance from the center of the region of interest to the farthest point on the edge of the retargeted image 300.

Figure 16:
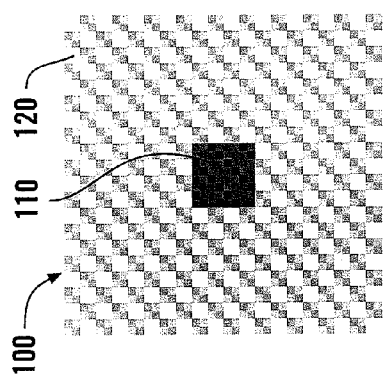
FIG. 16 is an exemplary image having a centrally-located region of interest.
Figure 17:
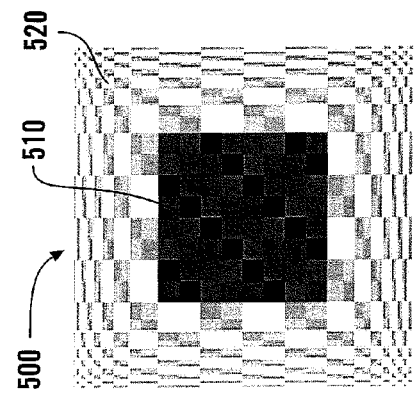
FIG. 17 is a first exemplary retargeted image generated from FIG. 16 using the 3-step piecewise-linear Cartesian fisheye warping function shown in FIG. 14.
Figure 18:
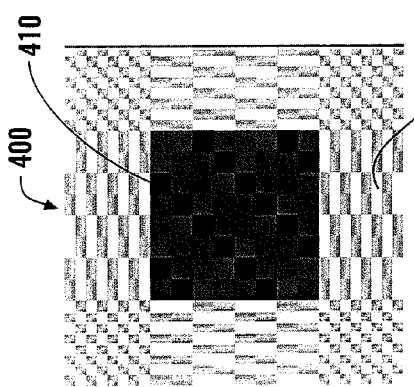
FIG. 18 is a second exemplary retargeted image generated from the original image shown in FIG. 16 using the continuous linear-quadratic Cartesian fisheye warping function shown in FIG. 15.
Figure 19:
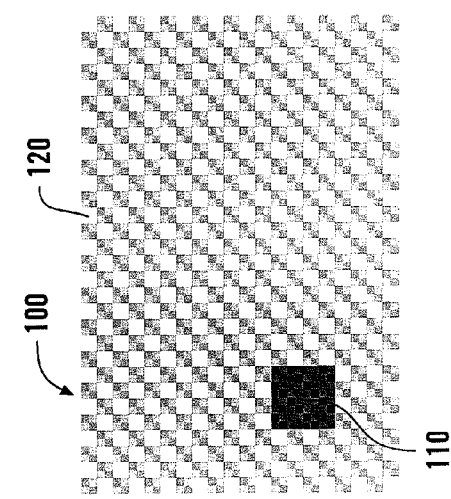
FIG. 19 is an original rectangular image having an off-center region of interest.
Figure 20:
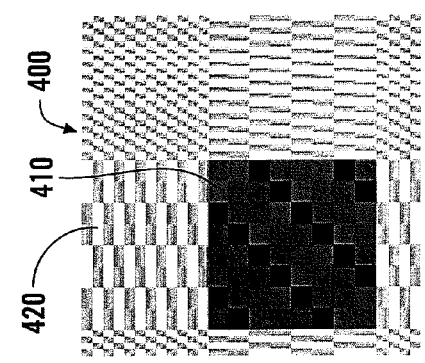
FIG. 20 is a first exemplary retargeted image generated from the original image shown in FIG. 19 using the 3-step piecewise-linear Cartesian fisheye warping function shown in FIG. 14.
Figure 21:
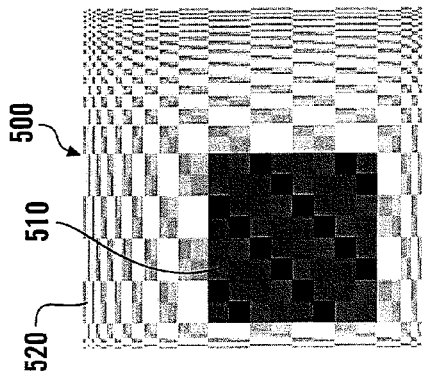
FIG. 21 is a second exemplary retargeted image generated from the original image shown in FIG. 19 using the continuous linear-quadratic Cartesian fisheye warping function shown in FIG. 15.

FIGS. 16-18 show a first exemplary embodiment and FIGS. 19-21 show a second exemplary embodiment of a generic original image 100, a linear Cartesian fisheye warped retargeted image 400 and a linear-quadratic Cartesian fisheye warped retargeted image 500, respectively. In particular, FIGS. 16-18 illustrate a centrally-located region of interest 110, while FIGS. 19-21 illustrate a region of interest 110 that is offset from the center of the original image 100.

As shown in FIG. 16, the region of interest 110 is centrally located within the square original image 100. FIG. 17 shows the resulting linear Cartesian fisheye warped retargeted image 400 formed by applying the linear Cartesian fisheye warping function shown in FIG. 14 to the original image 100 shown in FIG. 16. In particular, as shown in FIG. 17, for each of the horizontal or vertical dimensions, each of the neighboring image areas of the retargeted remaining image region 420 has a single constant magnification value applied to it. The region of interest 110 in the original image 100 is centrally located, such that the distance from each of the edges of the region of interest 110 to the nearest edge in the original image 100 is the same. Consequently, the magnification value along the horizontal or vertical dimensions is the same for each of the neighboring image areas (i.e., the image areas corresponding to the neighboring image areas 121-128 shown in FIG. 1) that are modified to obtain the retargeted remaining image region 420. As further shown in FIG. 17, each of the corner neighboring image portions (i.e., the image portions corresponding to the neighboring image portions 121, 123, 126 and 128 shown in FIG. 1) that are modified to obtain the retargeted remaining image region 420 are scaled in both the vertical and horizontal directions. Because the scaling factors used to scale these corner ones of the neighboring image areas of the retargeted remaining image region 420 are constants, the scaling across these corner ones of the neighboring image areas of the retargeted remaining image region 420 is constant in each of the horizontal and vertical directions.

In contrast, in FIG. 18, a linear-quadratic Cartesian fisheye warping function was applied to the original image 100 shown in FIG. 16 to obtain the linear-quadratic Cartesian fisheye warped retargeted image 500 shown in FIG. 18. In the retargeted image 500 shown in FIG. 18, the portions of the retargeted remaining image region 520 near the retargeted region of interest 510 are relatively more magnified, while the portions of the retargeted remaining image region 520 near the edges of the retargeted image 500 are relatively less magnified. However, rather than being abrupt and discontinuous, the changes in magnification from the region of interest 510 through the neighboring image areas of the retargeted remaining image region 520 are smooth.

In FIGS. 19-21, all of the comments outlined above with respect to FIGS. 16-18 are applicable. However, in FIGS. 20 and 21, because the left side of the remaining image region 120 is much smaller than the right side of the remaining image region 120, the left side of the retargeted remaining image regions 420 and 520, which are to the left of the retargeted regions of interest 410 and 510, respectively, are smaller than the right sides of the retargeted remaining image regions 420 and 520, that are to the right of the retargeted regions of interest 410 and 510, respectively. Similarly, in FIG. 21, the change in slope from the left edge of the retargeted region of interest 520 to the left edge of the retargeted image 500 is much steeper than the change in slope from the right edge of the retargeted region of interest 510 to the right edge of the retargeted image 500. It should be appreciated these statements are likewise true along the verticals dimension of the retargeted images 400 and 500.

FIGS. 22-29 are flowcharts that outline various features of one exemplary embodiment of a method for converting the original image 100 shown in FIG. 1 into the retargeted image 300 shown in FIG. 5 according to this invention. In particular, the method outlined in FIGS. 22-29 is usable to generate and display a retargeted image 300 on a display device, such as the cell phone 200, that has a smaller display screen 210 than that intended for the original image 100.

Figure 22:
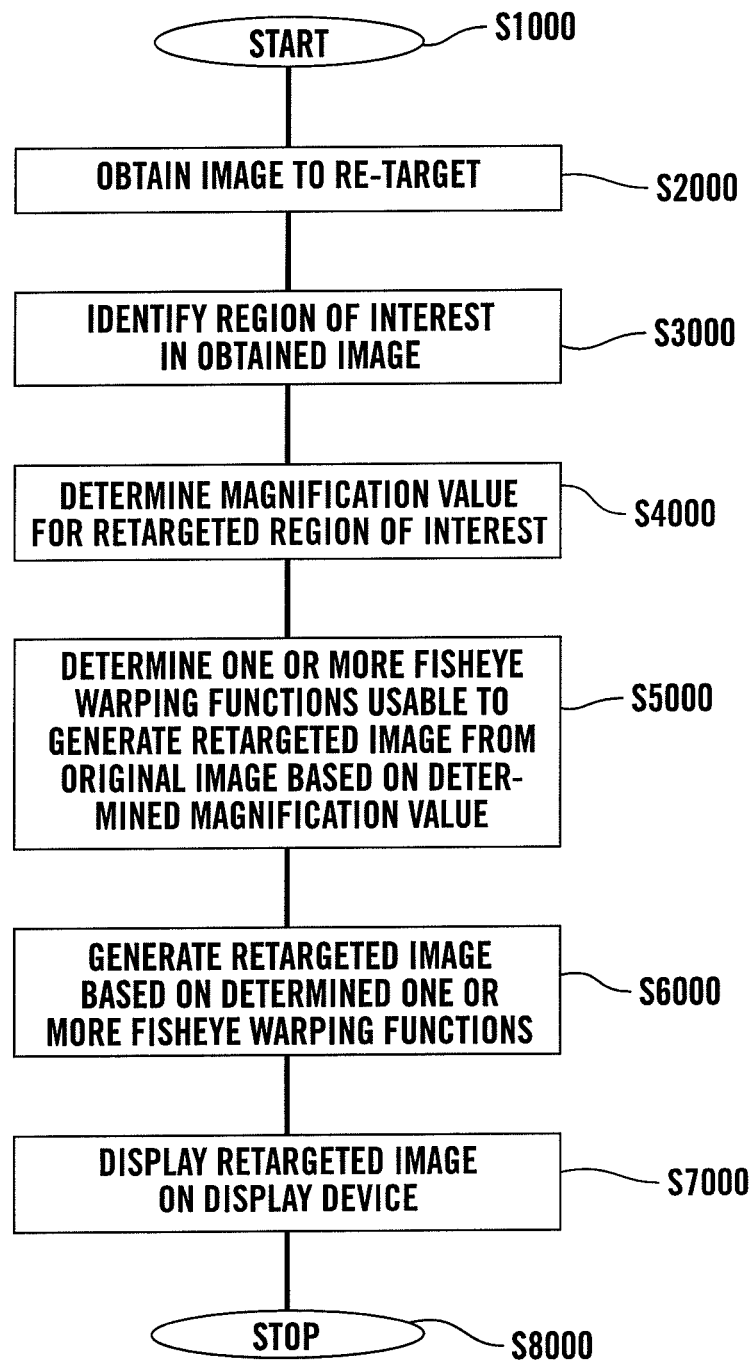
FIG. 22 is a flowchart outlining one exemplary embodiment of a method for retargeting an image according to this invention.

As shown in FIG. 22, operation of the method begins in step S1000 and continues to step S2000, where an image to be retargeted is obtained. Next, in step S3000, a region of interest in the obtained image is identified. As outlined above, the region of interest can be identified automatically or can be identified based on user input or the like. It should be appreciated that any known or later-developed system or method for identifying the region of interest can be used. Operation then continues to step S4000.

It should be appreciated that the image can be obtained in any known or later-developed manner, such as by capturing the image using an image capture device, such as a digital camera, a cell phone camera, a scanner, or any other known or later-developed image capture device. The image to be retargeted can also be obtained by reading and/or copying the image from a data storage device or structure, such as a hard drive, a floppy disk and drive, a CD-Rom disk and drive, a DVD-Rom disk and drive or the like. It should further be appreciated that the image can be obtained by downloading the image over a network, such as downloading the image as part of a web page obtained over the Internet, as image data provided from a remote site in response to interacting with an interactive web page, or by interacting with a particular computer program application or the like. Finally, the image to be retargeted could have been created from scratch using a computer program application or the like.

In step S4000, the magnification value for the retargeted region of interest within the retargeted image is determined. Then, in step S5000, the one or more fisheye warping functions usable to generate the retargeted image from the original image are determined. As outlined above, based on the position of the identified region of interest within the original image, different portions of the original image outside of the region interest may need to be modified or warped at different ratios so that the context and relationships of the region of interest to the rest of the original image is maintained in the retargeted image. Operation then continues to step S6000.

In step S6000, the retargeted image is generated based on applying the one or more fisheye warping functions to the original image. Then, in step S7000, the retargeted image is displayed on the display screen or window of the display device that the image has been retargeted for. Operation then continues to step S8000, where operation of the method ends.

Figure 23:
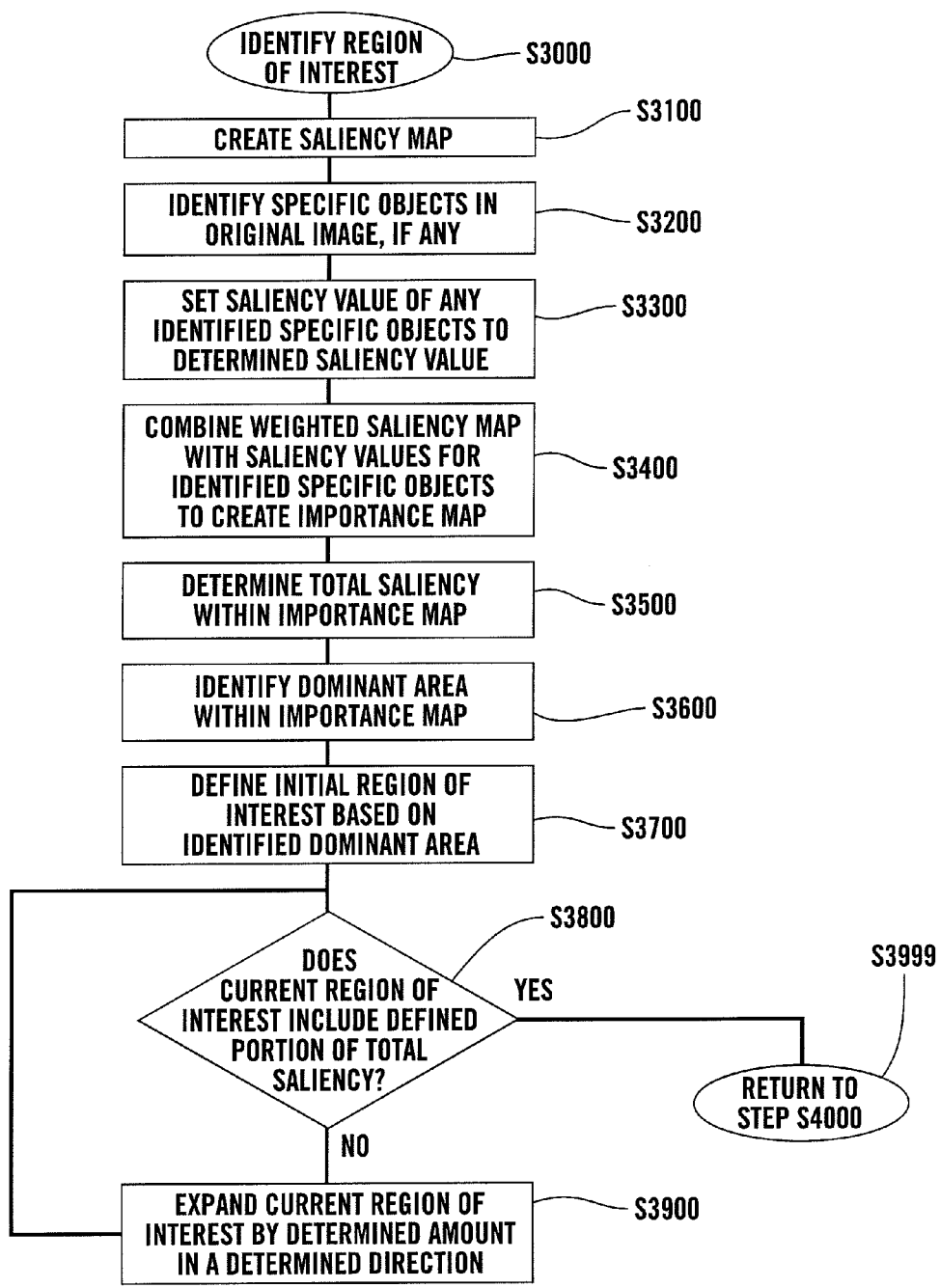
FIG. 23 is a flowchart outlining in greater detail one exemplary embodiment of a method for identifying a region of interest according to this invention.

FIG. 23 is a flowchart outlining in greater detail one exemplary embodiment of a method for automatically identifying a region of interest according to this invention. As shown in FIG. 23, beginning in step S3000, operation of the method for automatically identifying the region of interest continues to step S3100, where a saliency map of the entire image is created. Then, in step S3200, specific objects, if any, that appear in the original image are identified. Next, in step S3300, the saliency value of any such identified specific objects is set to a determined saliency value. Operation then continues to step S3400.

In step S3400, the weighted saliency map values are combined with the saliency values for the identified specific objects, if any, to create an importance map. Then, in step S3500, the total saliency within the importance map is determined. That is, the saliency values for each pixel in the importance map are summed to determine a total saliency amount occurring in the importance map for the original image. Next, in step S3600, a dominant area within the importance map is identified. Operation then continues to step S3700.

It should be appreciated that, in various exemplary embodiments, the dominant area within the importance map will typically be the area associated with a specific object if only a single specific object is identified in the image. Otherwise, if there are two or more identified objects, a particular dominant object must be selected or, if no specific object appears within the image, a dominant area for the image must be identified.

In step S3700, an initial region of interest is defined around the identified dominant area as the current region of interest. Typically, this region of interest will be rectangular. Alternatively, if the dominant area within the importance map follows the outline of a particular object within the image, the shape of that object or a simplified version of that shape can be used. Furthermore, a polygon having more sides or a more complex shape than a quadrilateral can be formed around the dominant area. Operation then continues to step S3800.

In step S3800, a determination is made whether the current region of interest includes a defined sufficient portion of the determined total amount of saliency within the image. It should be appreciated that this defined sufficient portion can be predetermined or can be determined as the image is being processed. In various exemplary embodiments, this defined sufficient portion is 70% of the total saliency within the importance map generated from the original image. If the amount of saliency within the current region of interest is at least the defined sufficient portion of the total amount of saliency of the importance map generated from the original image, operation jumps directly to step S3999. Otherwise, operation continues to step S3900.

In step S3900, one of the edges of a polygonal region of interest, or a portion of the edge of a curved region of interest, is expanded by a determined amount in a determined direction. This creates a new region of interest that contains a larger portion of the total saliency than did the previous version of the region of interest. Operation then returns to step S3800, where the determination regarding whether the (new) current region of interest has the defined sufficient portion of the total saliency of the original image is repeated. The loop through steps S3800 and S3900 continues until the revised current region of interest has at least the defined sufficient portion of the total amount of saliency in the original image. Once this occurs, operation jumps from step S3800 to step S3999. In step S3999, operation of the method returns to step S4000.

Figure 24:
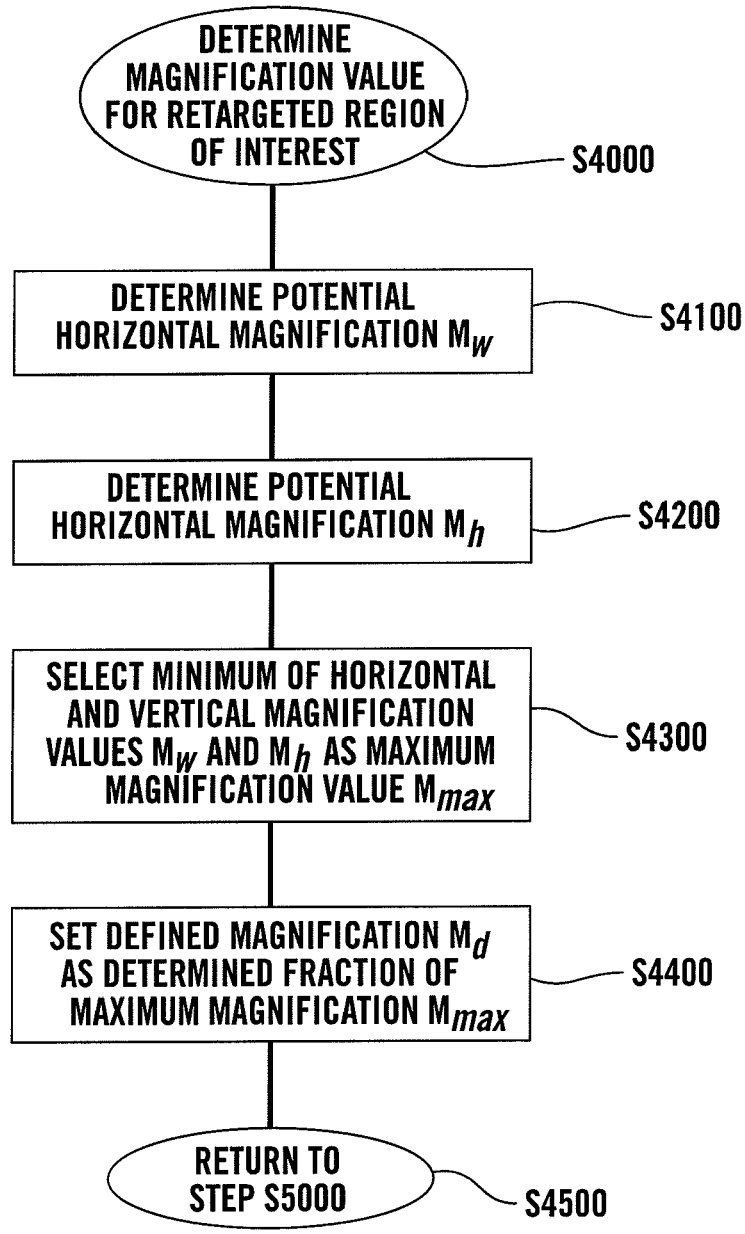
FIG. 24 is a flowchart outlining in greater detail one exemplary embodiment of a method for determining a magnification value for retargeting a determined region of interest according to this invention.

FIG. 24 is a flowchart outlining in greater detail one exemplary embodiment of the method for determining the magnification value for the region of interest of step S4000. As shown in FIG. 24, operation of the method begins in step S4000 and continues to step S4100, where the potential maximum horizontal magnification $M_w$ is determined. Then, in step S4200, the potential maximum vertical magnification $M_h$ is determined. It should be appreciated that, in various exemplary embodiments, the horizontal magnification $M_w$ is defined as the ratio of the width of the display screen or window for the retargeted image $D_w$ and the width of the identified region of interest $I_w$ of the original image, or $M_w=D_w/I_w$. Similarly, the maximum potential vertical magnification $M_h$ is the ratio of the display screen height $D_h$ or window for the retargeted image and the height of the determined region of interest $I_h$ of the original image or $M_h=D_h/I_h$.

After determining the potential maximum vertical and horizontal magnification values in steps S4100 and S4200, in step S4300, the minimum or lesser of the horizontal and vertical maximum magnification values $M_w$ and $M_h$ is selected as the maximum magnification value $M_{max}$. Then, in step S4400, the defined magnification $M_d$ is set as a determined portion of the maximum magnification value $M_{max}$. Operation then continues to step S4500, which returns operation of the method to step S5000.

It should be appreciated that, in various exemplary embodiments, the determined portion is a predetermined value. In various exemplary embodiments, the inventors have determined that a value of 0.70 for the defined magnification $M_d$ provides an appropriately sized retargeted region of interest. This value is particularly useful when the retargeting device is similar to the cell phone 200 shown in FIGS. 2-5. However, it should be appreciated that the defined magnification $M_d$ of the maximum magnification $M_{max}$ can be any desired value. As discussed above, for a small-size display screen, the retargeted region of interest is typically not actually increased in size relative to the size of the original region of interest in the original image. In this case, it is unusual to set the value for the defined magnification $M_d$ to a number greater than 1.0.

As indicated above, the remaining image region can be warped using any desired fisheye warping function, such as a polar-radial fisheye warping function, a Cartesian fisheye warping function, a linear Cartesian fisheye warping function or a linear-quadratic Cartesian fisheye warping function. As indicated above, in various exemplary embodiments, the fisheye warping function modifies the horizontal or vertical extent of the original image in a multi-piece, piece-wise fashion. Within the region of interest, the fisheye warping function linearly interpolates between the edges, such as the left and right or top and bottom edges of the Cartesian fisheye warping function, of the region of interest to provide uniform scaling based on the determined magnification factor $M_d$. For the linear Cartesian fisheye warping function, a simple scaling function also uses linear interpolation between the x-axis values for the positions of the left and right edges of the region of interest and the x-axis positions of the left and right edges of the warped image. In contrast, for linear-quadratic Cartesian fisheye warping, a quadratic function, specified in Bézier form, is used.

When a linear Cartesian fisheye warping functions is used, the major relevant warping function parameters are the scaling factors used to scale the dimensions of the various neighboring image areas 121-128 of the original remaining image region 120 to the dimensions of the various neighboring image areas 321-328 of the retargeted remaining image region 320 in the retargeted image 300. In general, these scaling factors correspond to the slopes of the various portions of the warping function shown in FIG. 14. As shown in FIG. 14, because of the constraint that the warping function be continuous and the edges of the original image map to the edges of the retargeted image 300, the scaling factors or slopes depend on the relative dimensions of the original image 100 and the retargeted image 300 and the relative location of the region of interest 110 within the original image 100, as outlined above. In contrast, when a linear-quadratic Cartesian fisheye warping function is used, in various exemplary embodiments, the fisheye warping function parameters are the parameters that define the linear portion used to scale the region of interest and that define the quadratic Bézier curves that are used for the other portions of the warping function. It should be appreciated that the shape of the curve that defines the instantaneous scaling factor can be fixed or can be determined on the fly.

Figure 25:
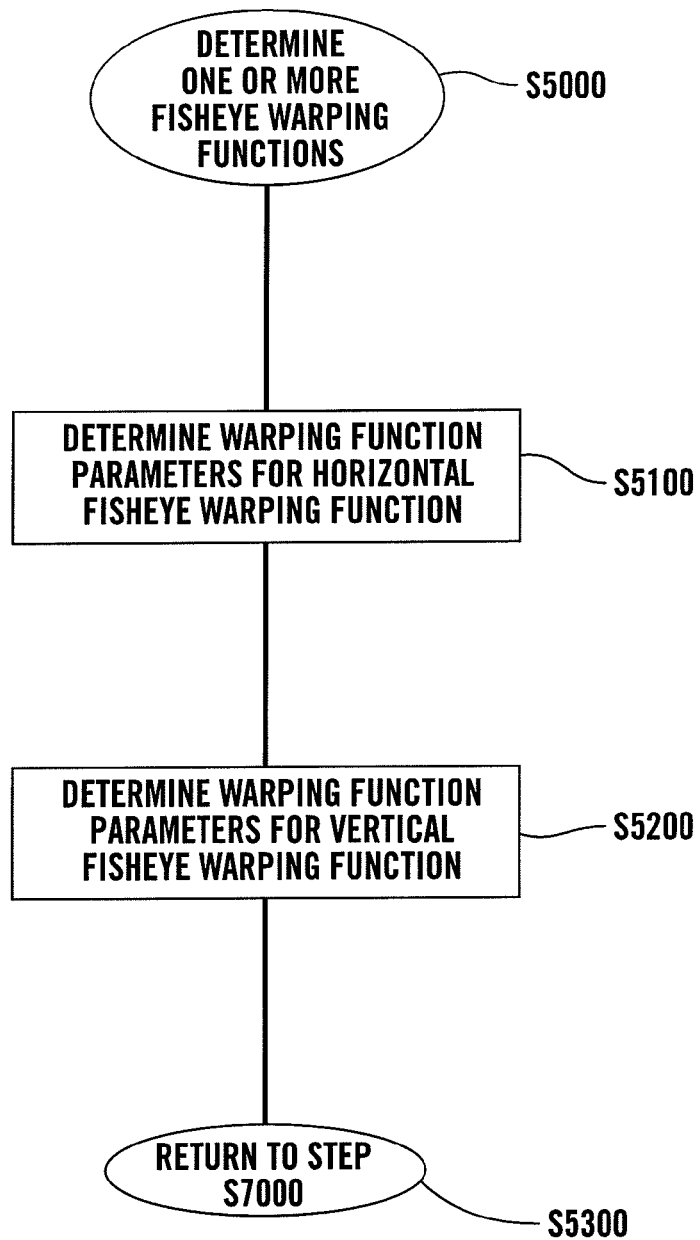
FIG. 25 is a flowchart outlining in greater detail one exemplary embodiment of a method for determining one or more fisheye warping function parameter to be used when applying a fisheye warping function to the original image according to this invention.

FIG. 25 is a flowchart outlining in greater detail one exemplary embodiment of a method for determining the one or more fisheye warping functions of step S5000. As shown in FIG. 25, beginning in step S5000, operation continues to step S5100, where, for a quadrilateral original region of interest 110, the horizontal fisheye warping function parameters are determined. Then, in step S5200, the vertical fisheye warping function parameters are determined. Operation then continues to step S5300, which returns operation of the method to step S7000. Of course, if there are more than two warping functions, additional steps similar to steps S5100 and S5200, may be inserted between steps S5200 and S5300.

Again, of course, if the region of interest 110 is not a rectangle, the warping functions will not necessarily be horizontal and vertical, but will depend on the orientations of the sides of the polygonal region of interest, and additional steps may be needed to warp the remaining image regions created based on such orientations. It should be appreciated that, in the specific exemplary embodiment set forth in steps S5100 and S5200, the fisheye warping function parameters are those of a linear Cartesian fisheye warping function.

In steps S5100 and S5200, the parameters of the linear Cartesian fisheye warping functions are determined based on the determined magnification value $M_d$ and the relative dimensions of the original and retargeted images 100 and 300. The position for the magnified region of interest in the retargeted image 300 is determined so that the proportions of the portions 321-328 of the retargeted remaining image region 320 in the warped image remain constant relative to the proportions of the corresponding portions 121-128 of the original remaining image region 120 in the original image 100. For example, the ratio of the horizontal dimension of the neighboring image portions 121, 124 and 126 to the horizontal dimension of the neighboring image portions 123, 125 and 128 in the original image 100 is the same as the ratio of the horizontal dimension of the remaining image portions 321, 324 and 326 to the horizontal dimension of the remaining image portions 323, 325 and 328 in the retargeted image 300.

Figure 26:
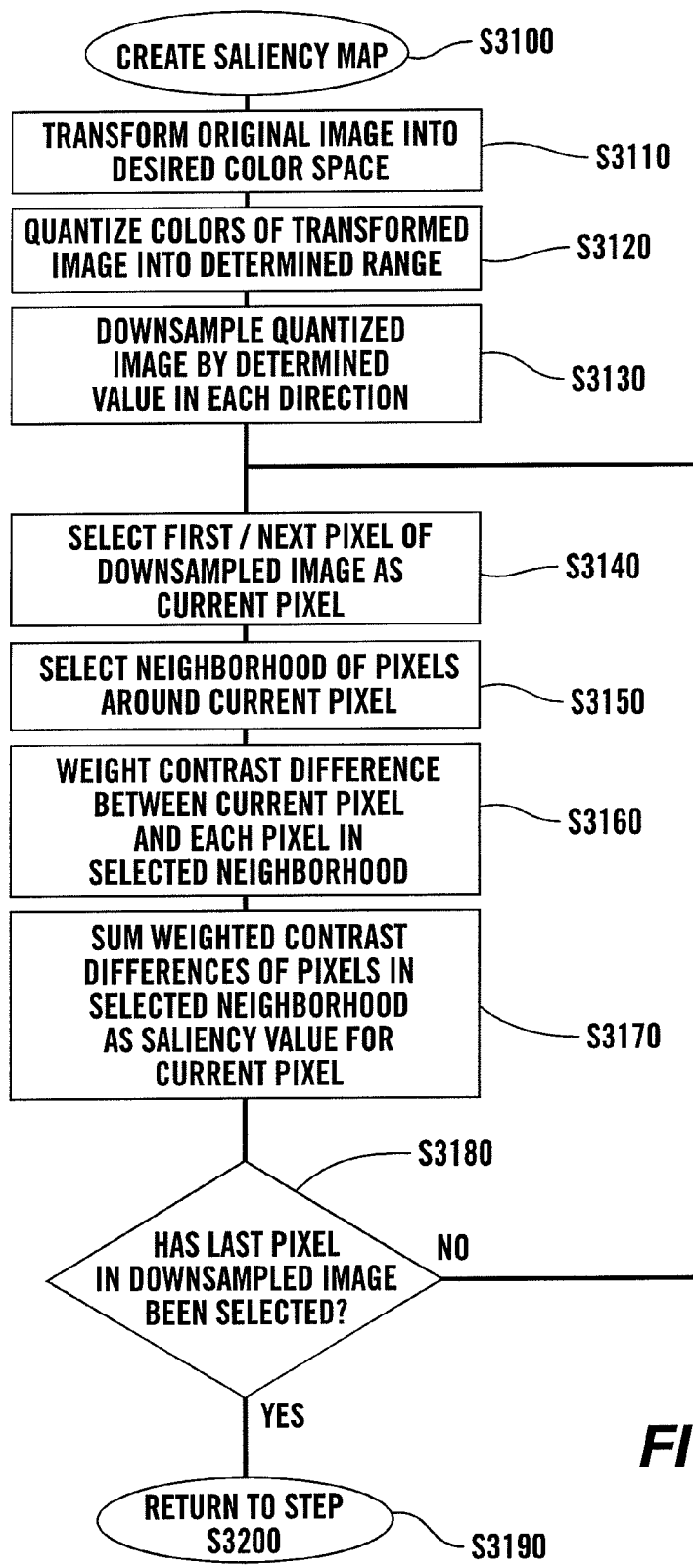
FIG. 26 is a flowchart outlining in greater detail one exemplary embodiment of a method for creating a weighted saliency map according to this invention.

FIG. 26 is a flowchart outlining in greater detail one exemplary embodiment of a method for creating a saliency map of step S3300. In particular, the method outlined in FIG. 26 generates the saliency map directly from the original image, without creating the interim contrast map shown in FIGS. 8 and 9.

As shown in FIG. 26, operation of the method begins in step S3100 and continues to step S3110, where the original image is transformed into a desired color space. In various exemplary embodiments, this desired color space is a perceptually uniform color space, such as the Lu*v* color space. Next, in step S3120, the colors of the transformed image are quantized into a determined range. This is done to reduce the computational complexity of the process and to make the step from one color image value to the next more significant. Then, in step S3130, the quantized image is down-sampled by a determined value in each direction. In various exemplary embodiments, the determined value is predetermined. In various other exemplary embodiments, the determined value is determined on the fly. In various exemplary embodiments, the predetermined value is four. Operation then continues to step S3140.

In step S3140, a first or next pixel of the down-sampled image is selected as the current pixel. Then, in step S3150, a neighborhood of pixels around the current pixel is selected. Next, in step S3160, the contrast difference between the current pixel and each pixel in the selected neighborhood is determined and weighted. Then, in step S3170, the weighted contrast differences of the pixels in the selected neighborhood are summed and stored as the weighed saliency value for the current pixel. Operation then continues to step S3180.

In step S3180, a determination is made whether the last pixel in the down-sampled image has been selected. If not, operation returns to step S3140. Otherwise, operation continues to step S3190. It should be appreciated that, each time operation returns to step S3140, a next pixel of the down-sampled image is selected as the current pixel. In contrast, once the last pixel has been selected, in step S3190, operation is returned to step S3200. It should be appreciated that, in step S3160, in various exemplary embodiments, the selected neighborhood is a 5×5 pixel square area around the current pixel.

Figure 27:
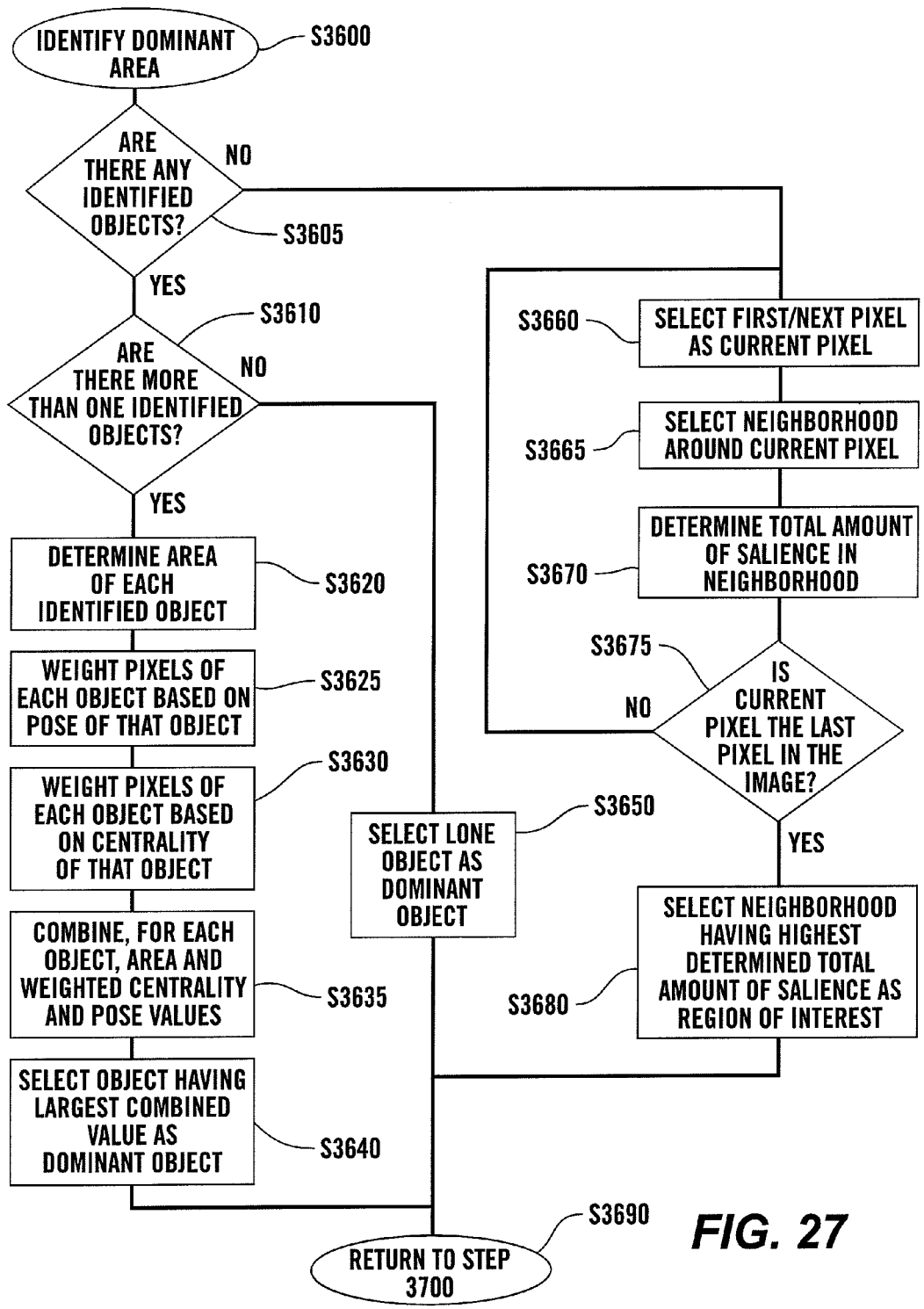
FIG. 27 is a flowchart outlining in greater detail one exemplary embodiment of a method for identifying a dominant area of the image according to this invention.

FIG. 27 is a flowchart outlining in greater detail one exemplary embodiment of a method for identifying a dominant area in the importance map of step S3600. As shown in FIG. 27, operation of the method begins in step S3600 and continues to step S3605, where a determination is made whether there are any identified objects in the image. If not, operation jumps to step S3660. Otherwise, operation continues to step S3610. In step S3610, a further determination is made whether there is more than one identified object in the image. If not, operation jumps to step S3650. Otherwise, because there is more one identified object in the importance map, operation continues to step S3620.

In step S3620, the area of each identified object is determined. Then, in step S3625, each of the pixels of each of the multiple objects is weighted based on the pose of that object. In particular, the pose indicates the orientation of the identified object in the image. For example, with faces, the pose can be facing the viewer, facing away from the viewer, facing sideways, or the like. For faces, poses where the person is facing the camera are weighted more heavily than poses that are at an angle to the camera. For other objects, other poses may be weighted more heavily, depending upon the information content of the poses of those objects. Operation then continues to step S3630.

In step S3630, each of the pixels of each of the identified objects is weighted based on its centrality, i.e., its distance from the center of the original image. It should be appreciated that the center of the image can refer to the geometrical center, the center of gravity, or the like.

After weighting each of the pixels of each object based on the centrality of that object in step S3630, in step S3635, for each object, the determined area and the weighted centrality values and pose values associated with each of the objects are combined into a single dominance value. Then, in step S3640, the object having the largest combined dominance value is selected as the dominant area. Operation then jumps to step S3690.

In contrast, in step S3650, because there is only a single object, the lone object in the image is selected as the dominant area. Operation then again jumps to step S3690. In contrast to steps S3610-S3650, in step S3660, there is no identified object in the image. Accordingly, in step S3660, a first or next pixel is selected as the current pixel. Next, in step S3665, a neighborhood is selected around the current pixel. In various exemplary embodiments, the neighborhood is 20×20 pixels. In various other exemplary embodiments, the neighborhood can be some other size or can be determined on the fly based on the size of the original image or any other appropriate factor. Next, in step S3670, the total amount of salience in the selected neighborhood around the current pixel is determined. Operation then continues to step S3675.

In step S3675, a determination is made whether the current pixel is the last pixel in the image. If not, operation jumps back to step S3660, and the next pixel is selected as the current pixel and steps S3665-S3675 are repeated. In contrast, once the current pixel is determined to be the last pixel in the image, operation continues from step S3675 to step S3680. In step S3680, the neighborhood having the highest determined total amount of salience within that neighborhood is selected as the dominant region. Operation then again jumps to step S3690, where operation of the method returns to step S3700.

Figure 28:
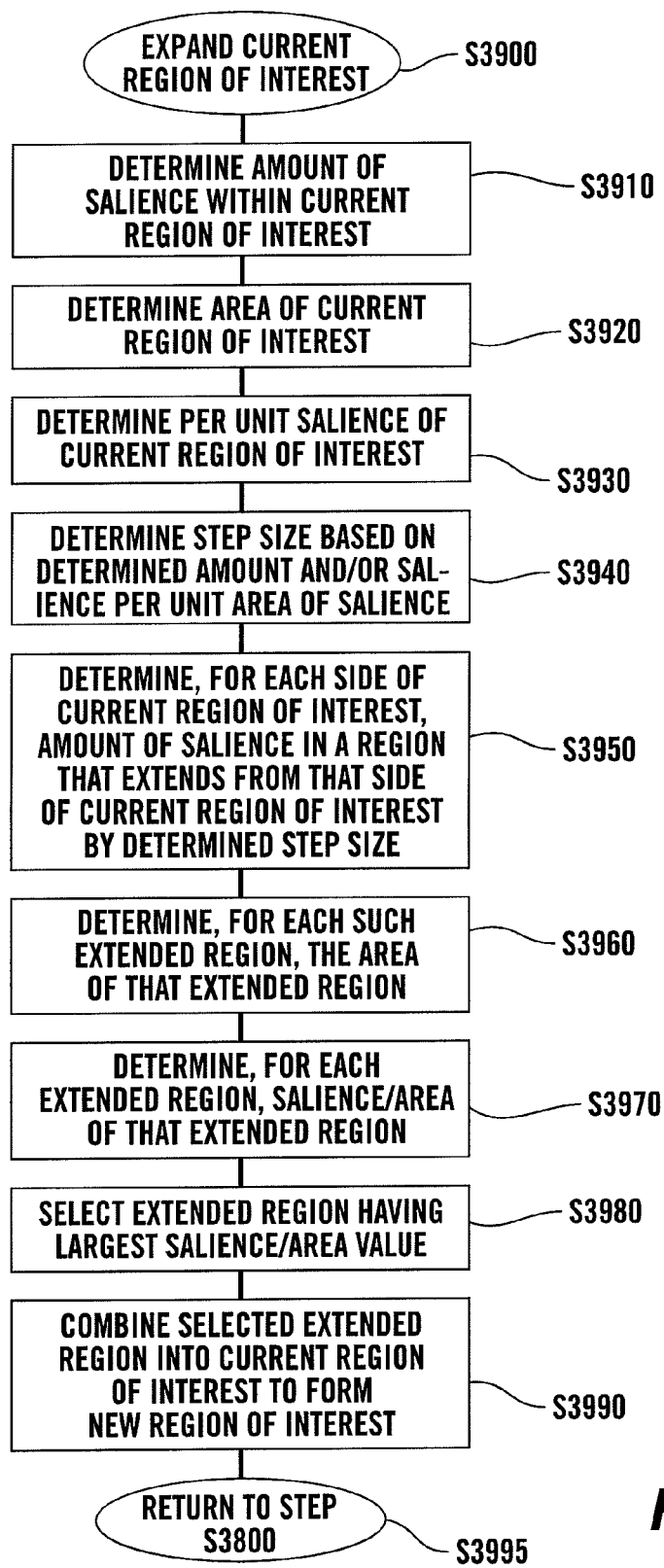
FIG. 28 is a flowchart outlining in greater detail one exemplary embodiment of a method for expanding a current region of interest according to this invention.

FIG. 28 is a flowchart outlining in greater detail one exemplary embodiment of a method for expanding the current region of interest of step S3900. As shown in FIG. 28, beginning in step S3900, operation of the method continues to step S3910, where the amount of salience within the current region of interest is determined. The initial current region of interest is the determined dominant area. Next, in step S3920, the area of the current region of interest is determined. Then, in step S3930, the salience per unit area of the current region of interest is determined. Operation then continues to step S3940.

In step S3940, a step size is determined based on the determined portion of salience and the determined salience per unit area within the current region of interest. Next, in step S3950, for each side of the current region of interest, an amount of salience in a region that extends from that side of the current region of interest by the determined step size is itself determined. Thus, for a quadrilateral region of interest, a quadrilateral region adjacent to each such side is determined. Each quadrilateral region has a width or height equal to the step size and a height or width, respectively, equal to the length of the side of the current region of interest that the extended quadrilateral region is adjacent to. Operation then continues to step S3960.

In step S3960, for each such extended region adjacent to one of the sides of the current region of interest, the area of that extended region is determined. Then, in step S3970, for each such extended region, the salience per unit area of that extended region is determined. Next, in step S3980, the extended region having the largest salience per unit area value is selected. Operation then continues to step S3990.

In step S3990, the selected extended region is combined with the current region of interest to form a new region of interest. Operation then continues to step S3995, which returns control of the method to step S3800.

It should be appreciated that, in various exemplary embodiments, as the full amount of salience within the current region of interest increases, such that the total amount of salience within the current region of interest approaches the defined portion of the total amount of salience within the original image, the step size is reduced. That is, when the region of interest is first formed, and a total amount of salience is much less than the defined portion, a large step size allows the region of interest to grow rapidly. Then, as the region of interest approaches its final size, the step size is reduced to allow the size and position of the region of interest to be fine tuned. However, it should be further appreciated that, in various exemplary embodiments, the step size can be fixed. Furthermore, in various other exemplary embodiments, steps S3920 and S3930 can be omitted and step S3940 altered accordingly.

Figure 29:
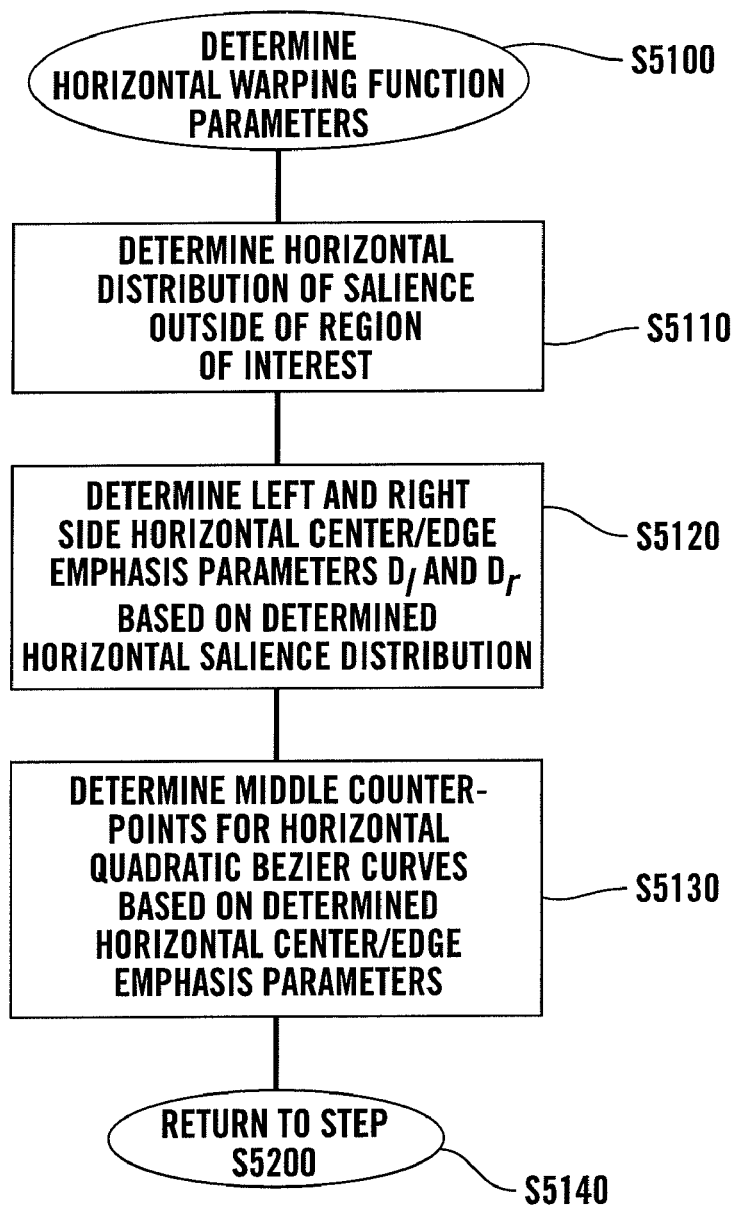
FIG. 29 is a flowchart outlining in greater detail one exemplary embodiment of a method for determining the horizontal warping function parameters according to this invention.

FIG. 29 outlines one example embodiment of a method for determining the horizontal warping function parameters in step S5100 when a linear-quadratic Cartesian fisheye warping function is used and the curve parameters are determined on the fly. In particular, in FIG. 29, the horizontal warping function parameters are determined. It should be appreciated that the same steps discussed below can also be used to determine the vertical warping function parameters of S5200.

As show in FIG. 29, beginning in step S5100, operation continues to step S5110, where, in this exemplary embodiment for determining the horizontal warping function parameters, the horizontal distribution of the salience outside of the region of interest is determined. For example, in some images the salience that is not within the region of interest can be distributed horizontally such that the majority of that salience is adjacent to the region of interest. In contrast, in other images the horizontal distribution of the salience can be such that most of the salience outside the region of interest is adjacent to the edges of the image, equally distributed between the edges of the region of interest and the image or uses some other distribution.

Then, in step S5120, the left and right side horizontal center/edge emphasis parameters $D_L$ and $D_R$ are determined based on the determined horizontal salience distribution. These parameters indicate how steeply the quadratic portion of the warping functions of each of the left and right side adjacent image areas should be.

Next, in step S5130, the middle counterpoints for the horizontal quadratic Bézier curves are determined based on the horizontal center/edge emphasis parameters. This allows the Bézier curves that are used to implement the quadratic portions of the warping function to be fully defined. Operation then continues to step S5140, which returns operation of the method to step S5200.

Figure 30:
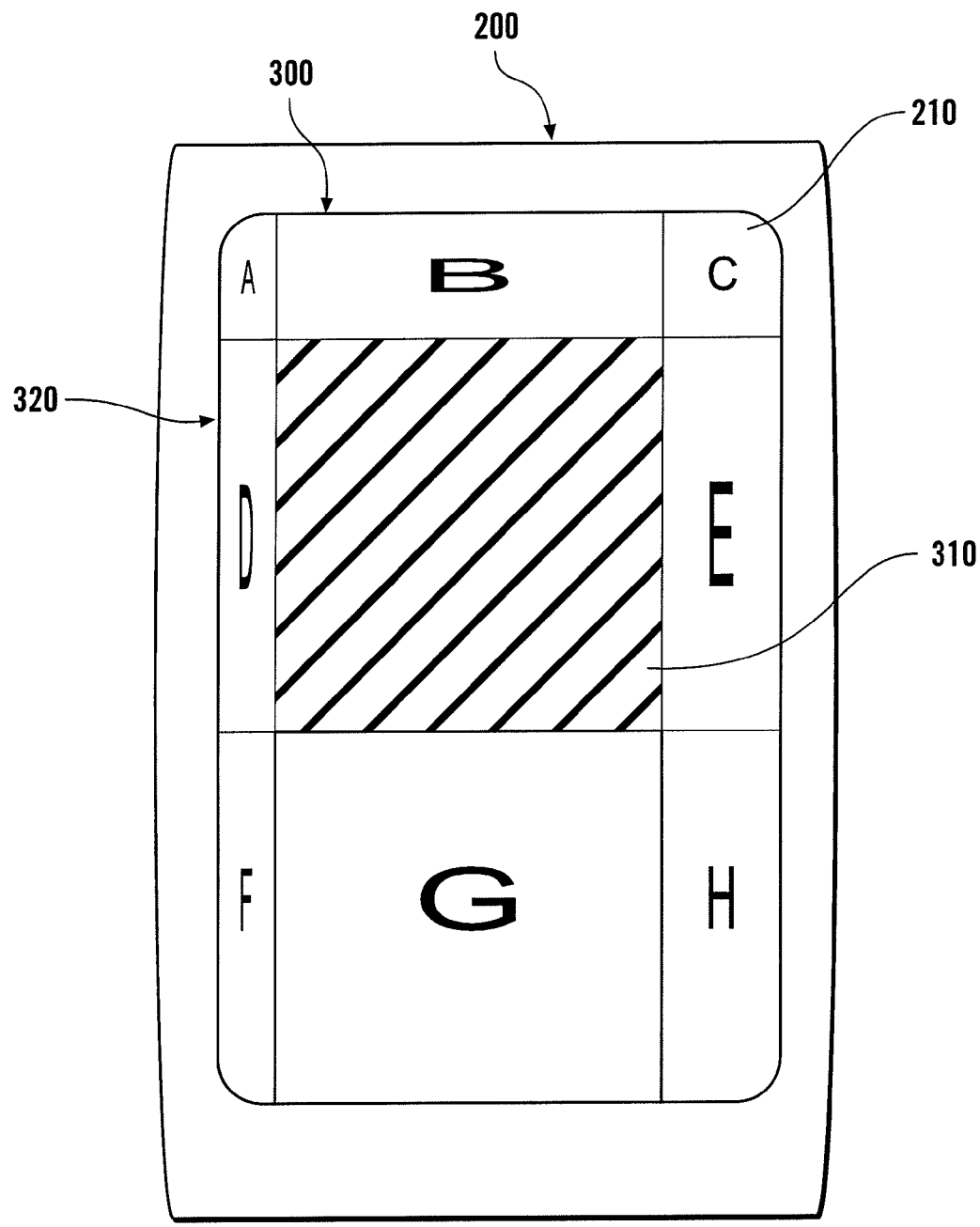
FIG. 30 illustrates the display device of FIG. 2 displaying a second exemplary embodiment of a retargeted image according to this invention, where the region of interest is not centered in the original image.

FIG. 30 shows a second exemplary embodiment of an image retargeted for the display screen 210 according to this invention. In the original image that has been retargeted in FIG. 30, the determined region of interest was not located in the center of the original image, but was located offset from the center of the original image toward the upper left corner of the original image. Accordingly, as in FIG. 19, the horizontal extent or dimension of the left side of the remaining image region 120 is substantially less than the horizontal extent or dimension of the right side of the remaining image region 120. Similarly, the vertical extent or dimension of the top side of the remaining image region 120 is much less than the vertical extent or dimension of the bottom side of the remaining image region 120 of that original image 100.

Accordingly, when the retargeted image 300 is displayed on the display screen 210, the top side of the remaining image region 320 occupies a smaller proportion of the display screen 210 than does the bottom side of the remaining image region 320. Likewise, the left side of the remaining image region 320 occupies a smaller proportion of the display screen 210 than does the right side of the remaining image region 320. However, the ratio of the vertical extent of the top side of the remaining image region 320 to the vertical extent of the top side of the remaining image region 120 of the original image 100 is equal to the ratio of the vertical extent of the bottom side of the remaining image region 320 to the vertical extent of the bottom side of the remaining image region 120 of the original image 100. Likewise, the ratios of the horizontal extents of the left side and of the right side of the remaining image regions 320 and 120 of the retargeted and original images 300 and 100 are equal.

Figure 31:
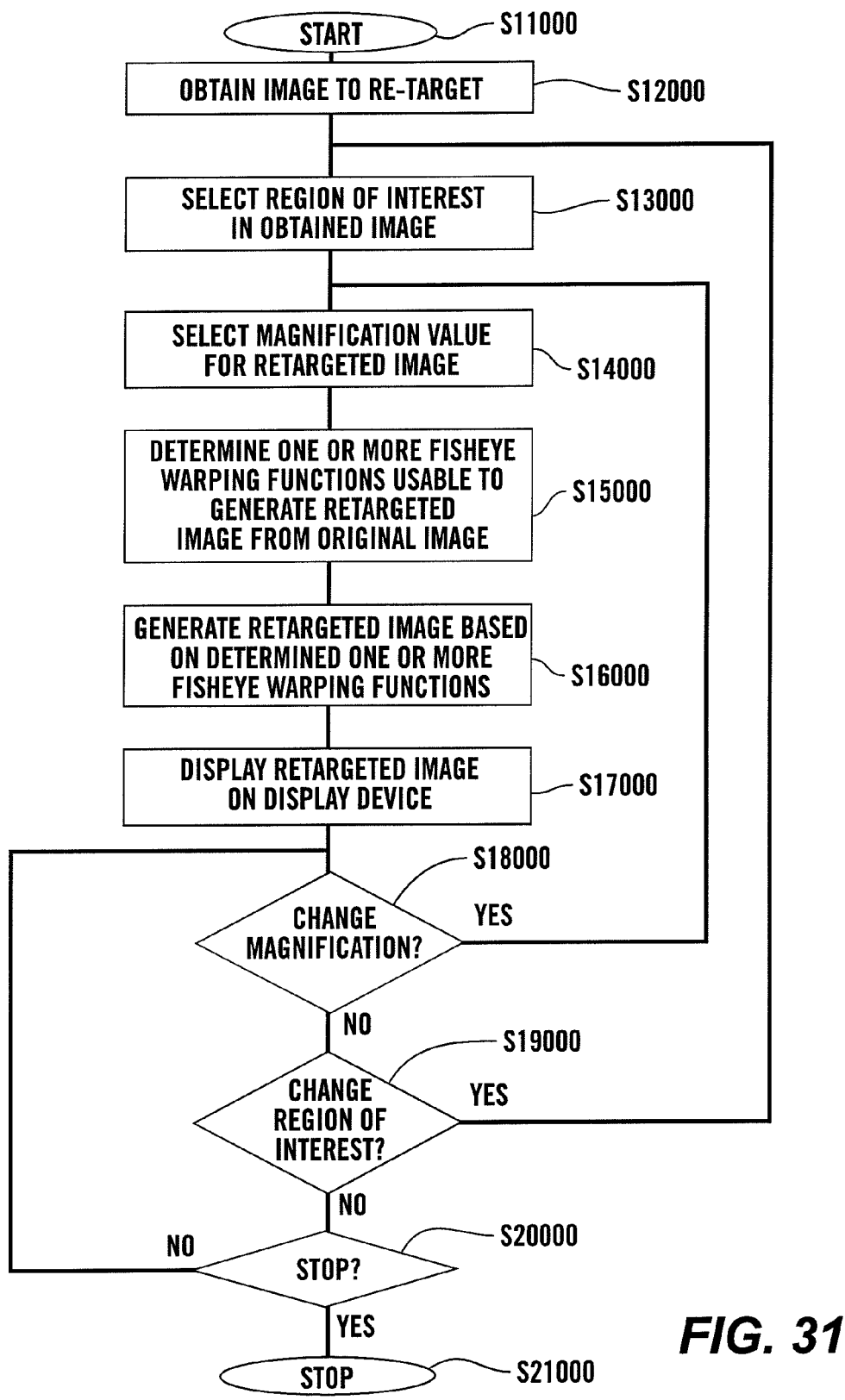
FIG. 31 is a flowchart outlining a second exemplary embodiment of a method for generating a retargeted image according to this invention.

FIG. 31 is a flowchart outlining one exemplary embodiment for generating a retargeted image while manually and/or interactively selecting the region of interest. In particular, as shown in FIG. 31, operation of the method begins in step S11000 and continues to step S12000 where the image to be retargeted is obtained. Then, in step S13000, the region of interest in the obtained image is manually selected by the viewer. Next, in step S14000, the viewer selects the magnification to be used with the selected region of interest. Operation then continues to step S15000.

In step S15000, the one or more fisheye warping functions to be used to generate the retargeted image from the original image are determined. Next, in step S16000, the retargeted image is generated by applying the one or more determined fisheye warping functions to the original image. Then, in step S17000, the retargeted image is displayed on a display device that the retargeted image has been generated for. Operation then continues to step S18000.

In step S18000, a determination is made whether the user wishes to change the magnification. If so, operation jumps back to step S14000. Otherwise, operation continues to step S19000. In step S19000, a determination is made whether the user wishes to change the region of interest. If so, operation jumps back to step S13000. Otherwise, operation continues to step S20000. In step S20000, a determination is made whether the viewer wishes to stop the retargeted image generating process. If not, operation jumps back to step S18000. Otherwise, operation continues to step S21000, where operation of the method ends.

It should be appreciated that, in various other exemplary embodiments of the method outlined in FIG. 31, rather than allowing the user to select the magnification, the magnification can be automatically determined as outlined above with respect to the method discussed with respect to FIGS. 23-29. In such case, step S14000 would be modified and step S18000 would be omitted. Alternatively, rather than moving the ability of the user to change the magnification, the region of interest could be automatically determined as outlined above with respect to FIGS. 23-29, while allowing the user to select the magnification to be used. In this case, step S13000 would be modified, while step S19000 would be omitted.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A method for generating a retargeted image from an original image, comprising:
    determining a region of interest within an original image, the original image having image areas outside of the determined region of interest forming at least one other image region, the region of interest having at least one major direction;
    determining a magnification value usable to scale the determined region of interest along each major direction;
    determining warping function parameters of at least one warping function usable to variably warp the at least one other image region along each major direction; and
    in a computer circuit, modifying original image data that represents the determined region of interest and the at least one other image region, respectively using the determined magnification value and the determined warping function parameters to generate a retargeted image having a modified region of interest and at least one variably-warped modified other image region outside of the modified region of interest.

2. The method of claim 1, wherein determining the region of interest within the original image comprises, in the computer circuit, automatically determining the region of interest by processing the original image data with weighting data to identify a dominant object in the image, and setting a boundary of the region of interest based upon the identified dominant object.

3. The method of claim 1, wherein the determined region of interest is quadrilateral and determining the magnification value comprises:
    determining a width of the determined region of interest;
    determining a width of a display area to be used to display the retargeted image;
    determining a ratio of the determined widths;
    determining a height of the determined region of interest;
    determining a height of the display area to be used to display the retargeted image;
    determining a ratio of the determined heights; and
    setting the magnification based on the determined ratios.

4. The method of claim 3, wherein setting the magnification based on the determined ratios comprises:
    selecting a lesser one of the determined ratios; and
    setting the magnification value to a determined amount of the selected ratio.

5. The method of claim 1, wherein determining the warping function parameters of at least one warping function usable to warp the at least one other image region along each major direction comprises determining at least one of a piece-wise linear warping function parameter and a linear-quadratic warping parameter for each major direction of the determined region of interest, to variably warp the image within each other image region.

6. The method of claim 5, wherein determining at least one linear warping function parameter for each major direction of the determined region of interest comprises determining a plurality of linear warping function parameters for each major direction of the determined region of interest.

7. The method of claim 6, wherein the determined region of interest and the modified region of interest are each quadrilateral, and determining the plurality of linear warping function parameters for each major direction of the determined region of interest includes, in the computer circuit,
    determining, for each edge of the quadrilateral determined region of interest, a distance from that edge of the quadrilateral determined region of interest to an edge of the original image;
    determining, for each edge of the quadrilateral modified region of interest, a remaining distance of a display area to be used to display the retargeted image based on the determined magnification value;
    determining, for each edge of the quadrilateral modified region of interest, at least one linear warping function parameter based on the determined distance and the determined remaining distance.

8. The method of claim 1, wherein
    determining the warping function parameters of at least one warping function usable to warp the at least one other image region along each major direction comprises determining at least one non-linear warping function parameter for each major direction of the determined region of interest, and
    generating a retargeted image includes generating one of the other image regions having a magnification that continuously changes across the image according to the non-linear warping function parameter.

9. The method of claim 8, wherein the determined region of interest and the modified region of interest are each quadrilateral, and determining the plurality of non-linear warping function parameters for each major direction of the determined region of interest includes, in the computer circuit,
    determining, for each edge of the quadrilateral determined region of interest, a distance from that edge of the quadrilateral determined region of interest to an edge of the original image;
    determining, for each edge of the quadrilateral modified region of interest, a remaining distance of a display area to be used to display the retargeted image based on the determined magnification value;
    determining, for each edge of the quadrilateral modified region of interest, a non-linear warping function parameter usable to warp at least one other image region associated with that edge of the quadrilateral region of interest into at least one modified other image region associated with that edge of the quadrilateral modified region of interest based on the determined distance and the determined remaining distance.

10. The method of claim 8, wherein determining at least one non-linear warping function parameter for each major direction of the determined region of interest comprises determining a plurality of polynomial warping function parameters for each major direction of the determined region of interest.

11. The method of claim 1, wherein determining the magnification value usable to scale the determined region of interest along each major direction comprises determining a magnification value usable to linearly scale the determined region of interest along each major direction.

12. The method of claim 1, wherein
determining warping function parameters of at least one warping function includes using warping function parameters for the determined region of interest and an importance associated with different portions of the at least one other image region to determine the warping function parameters of at least one warping function usable to variably warp the at least one other image region along each major direction, and
modifying original image data to generate a retargeted image includes generating a retargeted image having at least one modified other image region outside of the modified region of interest, each modified other image region having respective portions therein that are variably warped relative to one another using the warping function parameters determined for the at least one other image region.

13. A system for generating retargeted image data for a retargeted image from original image data of an original image that has a determined region of interest, the original image data including region of interest data for the determined region of interest, image areas of the original image outside of the determined region of interest forming at least one other image region of the original image, the original image data including other image region data for the at least one other image region, the system comprising:
a computer circuit programmed to
generate modified region of interest data corresponding to a modified region of interest, by converting the region of interest data corresponding to the determined region of interest, the modified region of interest having a substantially linearly scaled amount of an image content of the determined region of interest and a substantially same aspect ratio as that of the determined region of interest; and
generate modified other image region data corresponding to at least one modified other image region, each modified other image region adjacent to the modified region of interest and corresponding to one of the at least one other image region of the original image, by, for each at least one modified other image region, applying at least one non-linear warping function to the other image region data for that corresponding other image region of the original image to variably warp the image within each other image region.

14. The system of claim 13, wherein the computer circuit is programmed to generate the modified region of interest data representing at least one modified other image region that provides additional context to the image content of the modified region of interest.

15. The system of claim 13, wherein the computer circuit is programmed to generate the modified other image region data by modifying the other image region data for the corresponding other image region using a first non-linear warping function along a first direction of the modified region of interest and a second non-linear warping function along a second direction.

16. The system of claim 15, wherein the second non-linear warping function is different from the first non-linear warping function.

17. The system of claim 15, wherein the first non-linear warping function is a first polynomial warping function and the second non-linear warping function is a second polynomial warping function.

18. The system of claim 17, wherein the computer circuit is programmed to use at least one of the first polynomial warping function and the second polynomial warping function to warp portions of the modified other image region at an increasing rate based upon a distance of the portions from the modified region of interest.

19. The system of claim 17, wherein the second polynomial warping function is different from the first polynomial warping function.

20. The system of claim 13, wherein the computer circuit is programmed to generate the modified other image region data corresponding to the at least one modified other image region by modifying the other image region data for the corresponding other image region using a first plurality of non-linear warping functions along a first direction of the modified region of interest and a second plurality of non-linear warping functions along a second direction.

21. The system of claim 20, wherein the second plurality of non-linear warping functions is different from the first plurality of non-linear warping functions.

22. A method for generating a retargeted image, having a modified region of interest and at least one modified other image region outside of the modified region of interest, from an original image represented by original image data, comprising:
determining a region of interest within the original image, image areas of the original image outside of the determined region of interest forming at least one other image region, the region of interest having at least one major direction;
determining a magnification value usable to scale the determined region of interest along each major direction;
determining warping function parameters of at least one warping function usable to variably warp each at least one other image region along each major direction;
modifying the original image to generate the retargeted image by
converting data in the original image data representing the determined region of interest into data representing the modified region of interest based on the determined magnification value; and
converting data in the original image data representing the at least one other image region into data representing the at least one modified other image region based on the determined warping function parameters, each other image region including an image that is variably magnified as a function of the linear distance away from the modified region of interest.

23. A computer device comprising:
a display; and
a computer circuit configured to
generate modified region of interest data corresponding to a modified region of interest, by converting region of interest data in original image data corresponding to a determined region of interest of an original image, based on a determined magnification value usable to scale the region of interest,
generate modified other image region data corresponding to at least one modified other image region by, for each modified other image region corresponding to one of the at least one other image regions of the original image, converting data for the other image region based on determined warping function parameters of at least one non-linear warping function to variably warp the image corresponding to the at least one other image region, and provide the modified region of interest data and the modified other region of interest data for displaying a modified version of the original image on the display.

24. The system of claim 23, wherein:
the determined region of interest and the modified region of interest each has at least one major direction; and
the computer circuit is programmed to generate the modified region of interest data by generating data that has a substantially linearly-scaled amount of image content of the determined region of interest data and, along each at least one major direction, a substantially same aspect ratio as that of the determined region of interest data.

25. The system of claim 23, wherein the computer circuit is programmed to generate modified region of interest data for each at least one modified other image region by generating at least one of data representing a substantially modified amount of image content relative to that of the corresponding other image region of the original image and data representing a substantially modified aspect ratio relative to that of the corresponding other image region of the original image.

26. A hand-held device comprising:
a display; and
a logic circuit configured to generate retargeted image data representing a retargeted image, from original image data representing an original image having a region of interest and other image regions that are distinct from the region of interest, by
converting original image data corresponding to the region of interest to generate retargeted region of interest data corresponding to a magnified version of the region of interest, based upon a magnification value,
converting original image data corresponding to the other image regions to generate retargeted other image region data corresponding to versions of each of the other image regions, each version having image portions therein variably magnified as a function of a distance of the image portion from the retargeted region of interest, and
providing the retargeted region of interest data and the retargeted other region of interest data for displaying a retargeted version of the original image on the display.

27. The device of claim 26, wherein the logic circuit is configured to
determine the magnification value based upon dimensions of the region of interest in the original image and dimensions of the display,
determine distances from edges of the region of interest to an edge of the original image,
determine distances from edges of the retargeted region of interest to edges of the display based on the determined magnification value,
determine, for each edge of the retargeted region of interest, a non-linear warping function parameter based on the respectively-determined distances, and
convert original image data corresponding to the other image regions by warping the other image region data using the determined non-linear warping function parameter to generate retargeted other image data corresponding to an image that, for each other image region, exhibits a continuously-varied magnification level that decreases as a function of the distance of portions of the image from the retargeted region of interest.

* * * * *